United States Patent
Matsuda

(10) Patent No.: US 8,395,812 B2
(45) Date of Patent: Mar. 12, 2013

(54) APPARATUS AND METHOD OF CONCEALING INFORMATION OF IMAGE DATA

(75) Inventor: Kohji Matsuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 826 days.

(21) Appl. No.: 12/461,999

(22) Filed: Aug. 31, 2009

(65) Prior Publication Data

US 2010/0053687 A1 Mar. 4, 2010

(30) Foreign Application Priority Data

Sep. 1, 2008 (JP) ................................. 2008-223065

(51) Int. Cl.
*H04N 1/60* (2006.01)

(52) U.S. Cl. ....... 358/1.9; 358/3.24; 358/3.28; 358/520; 358/521; 358/529

(58) Field of Classification Search .............. 358/1.9, 358/3.21–3.24, 518–522
See application file for complete search history.

(56) References Cited

U.S. PATENT DOCUMENTS

| | | | | |
|---|---|---|---|---|
| 5,321,470 A | * | 6/1994 | Hasuo et al. .............. | 399/366 |
| 6,067,555 A | * | 5/2000 | Hayashi ..................... | 715/234 |
| 7,423,769 B2 | * | 9/2008 | Yu ............................. | 358/1.1 |
| 7,518,760 B2 | | 4/2009 | Matsuda | |
| 7,742,197 B2 | * | 6/2010 | Takiyama et al. ......... | 358/3.28 |
| 8,179,556 B2 | * | 5/2012 | Salgado et al. ............ | 358/1.18 |
| 2005/0002053 A1 | * | 1/2005 | Meador et al. ............ | 358/1.14 |
| 2006/0126125 A1 | | 6/2006 | Matsuda et al. | |
| 2006/0262341 A1 | | 11/2006 | Matsuda | |
| 2007/0183000 A1 | * | 8/2007 | Eisen et al. ............... | 358/452 |
| 2007/0285708 A1 | | 12/2007 | Matsuda | |

FOREIGN PATENT DOCUMENTS

| | | |
|---|---|---|
| JP | 06-225134 | 8/1994 |
| JP | 2000-175031 | 6/2000 |
| JP | 2000-232576 | 8/2000 |
| JP | 2003-209700 | 7/2003 |
| JP | 2004-200962 | 7/2004 |
| JP | 2006-262376 | 9/2006 |
| JP | 2006-287707 | 10/2006 |
| JP | 2006-352922 | 12/2006 |

* cited by examiner

*Primary Examiner* — Richard Zhu

(74) *Attorney, Agent, or Firm* — Harness, Dickey & Pierce, P.L.C.

(57) ABSTRACT

When image data of an original document is detected to include specific information indicating outputting of the original document is prohibited, a selected color component of the image data is applied with concealing processing to make image data of the selected color component to be solid image data. The selected color component is determined based on whether outputting of the original document as a monochrome image is allowed or prohibited.

16 Claims, 20 Drawing Sheets

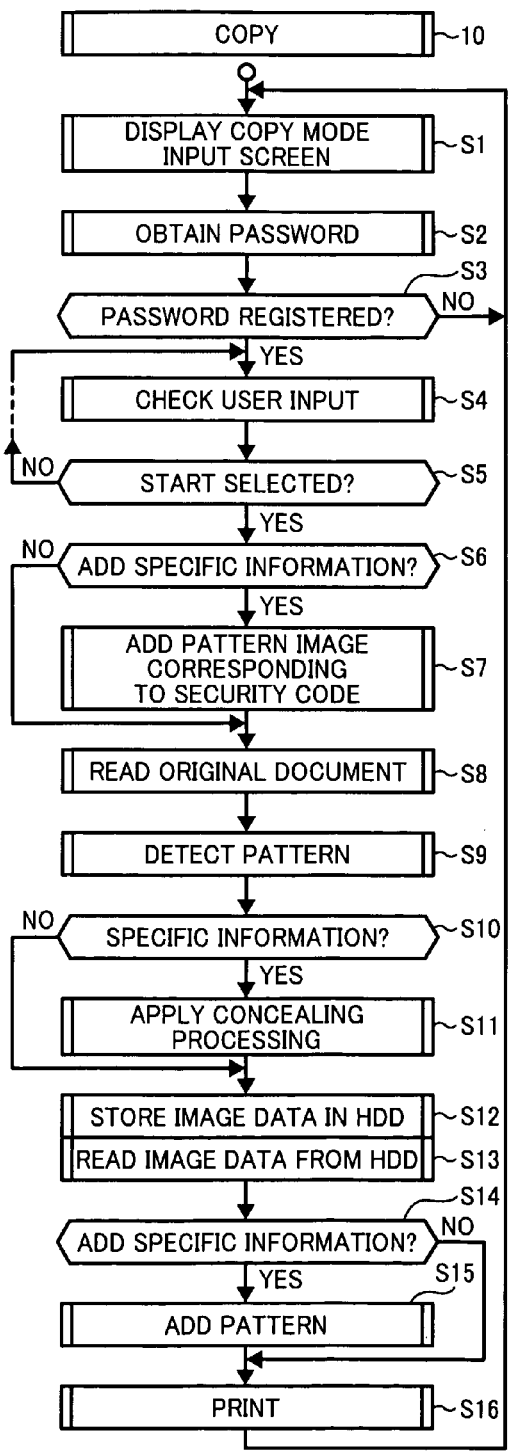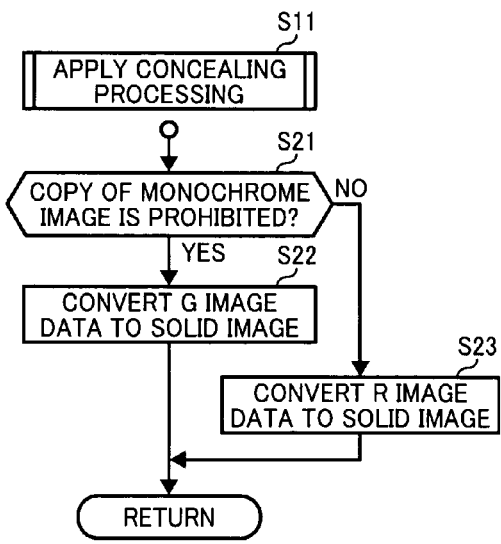

APPARATUS AND METHOD OF CONCEALING INFORMATION OF IMAGE DATA

CROSS-REFERENCE TO RELATED APPLICATIONS

This patent application is based on and claims priority under 35 U.S.C. §119 to Japanese Patent Application No. 2008-223065, filed on Sep. 1, 2008, in the Japanese Patent Office, the disclosure of which is hereby incorporated herein by reference.

FIELD OF THE INVENTION

The present invention generally relates to an apparatus and method of concealing information contained in image data, and more specifically to an apparatus and method of concealing information contained in image data when the image data is detected to include specific information indicating the output of the image data is prohibited.

BACKGROUND

The recent image forming apparatus may be provided with a function of concealing information contained in image data before the image data is output as a printed document, for example, in order to prevent the illegal copy of a monetary document such as a paper currency or a security. When the image forming apparatus determines that the original document to be copied includes specific information, which can be only observed in the paper currency or the security, the image forming apparatus may conceal the information contained in the image data of the original document by printing the image data with the solid black image.

For example, as described in the Japanese Patent Application Publication No. 2000-232576, after converting the RGB image data of an original document to image data of uniform color spaces, a currency recognizing device determines whether the original document contains a specific image. When it is determined that the original document contains the specific image, an image processing apparatus paints the YMCK image data converted from the image data of uniform color spaces.

In another example, the Japanese Patent Application Publication No. 2006-262376 describes an image processing apparatus, which paints the YMCK image data converted from the image data of an original document when the image data contains a group of dot patterns indicating that the image data is a specific image. The color of the color material used for panting can be selected so as to make the consumption rate is kept uniform among a plurality of colors. In another example, the Japanese Patent Application Publication No. 2006-175031 describes an image processing apparatus, which converts RGB image data to YMCK image data, applies concealing processing to the YMCK image data, and stores the processed image data. Alternatively, the image processing apparatus of the Japanese Patent Application Publication No. 2000-175031 may apply concealing processing to the RGB image data, and stores the processed image data.

In another example, the Japanese Patent Application Publication No. 2006-287707 describes an image processing apparatus, which stores image data obtained by a scanner in a memory. When reading of an original document completes, the image data is read out from the memory, and is painted when the image data is detected to be a specific image. Alternatively, the image data may be printed when a predetermined lines of the image data is read. In such case, when the image data is detected to be the specific image, painting is performed on the image data while printing the image data.

SUMMARY

In the above-described patent applications, concealing processing is applied to all color components of the image data, such as the RGB image data or the CMYK image data. However, a user may not desire to paint all color components of the image data, for example, when the image data is to be output as a monochrome image including only the black color component such as when facsimile image data received from a facsimile apparatus is output.

Example embodiments of the present invention include an image processing apparatus including: an input image data processing unit to apply image processing to RGB image data of an original document to generate primary processed RGB image data including R image data, G image data, and B image data; a specific information detector to determine whether the primary processed RGB image data includes specific information indicating outputting of the original document is prohibited to generate a detection result; and a conceal processor to convert the primary processed RGB image data to secondary processed RGB image data when the detection result of the specific information detector indicates that the primary processed RGB image data includes the specific information, wherein when outputting of the original document as a monochrome image is allowed even when the original document includes the specific information, the conceal processor applies concealing processing to only at least one of the R image data and the B image data included in the primary processed RGB image data to make the at least one of the R image data and the B image data to be solid image data, and when outputting of the original document as a monochrome image is prohibited when the original document includes the specific information, the conceal processor applies concealing processing to only the G image data of the primary processed RGB image data to make the G image data to be solid image data.

Example embodiments of the present invention include an image processing method including: applying image processing to RGB image data of an original document to generate primary processed RGB image data including R image data, G image data, and B image data; determining whether the primary processed RGB image data includes specific information indicating outputting of the original document is prohibited to generate a detection result; and converting the primary processed RGB image data to secondary processed RGB image data when the detection result of the specific information detector indicates that the primary processed RGB image data includes the specific information. When outputting of the original document as a monochrome image is allowed even when the original document includes the specific information, concealing processing is applied to only at least one of the R image data and the B image data included in the primary processed RGB image data to make the at least one of the R image data and the B image data to be solid image data. When outputting of the original document as a monochrome image is prohibited when the original document includes the specific information, concealing processing is applied to only the G image data of the primary processed RGB image data to make the G image data to be solid image data.

Example embodiments of the present invention include an image processing method including: determining whether image data of an original document includes specific information indicating outputting of the original document is prohibited to generate a detection result; applying concealing processing to a selected color component of the image data when the detection result indicates that the image data includes the specific information. The selected color component is determined based on whether outputting of the original document as a monochrome image is allowed or prohibited. When outputting of the original document as a monochrome image is allowed even when the original document includes the specific information, concealing processing is applied to only at least one of the R image data and the B image data included in the image data to make the at least one of the R image data and the B image data to be solid image data. When outputting of the original document as a monochrome image is prohibited when the original document includes the specific information, concealing processing is applied to only the G image data of the image data to make the G image data to be solid image data.

In addition to the above-described example embodiments, the present invention may be practiced in various other ways, for example, as an image processing system, a computer program including instructions that cause a processor to perform the above-described image processing method, or a recording medium storing the computer program.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is a flowchart illustrating operation of copying of FIG. 7;

FIG. 10 is a flowchart illustrating operation of applying concealing processing of FIG. 9;

Figure 1:
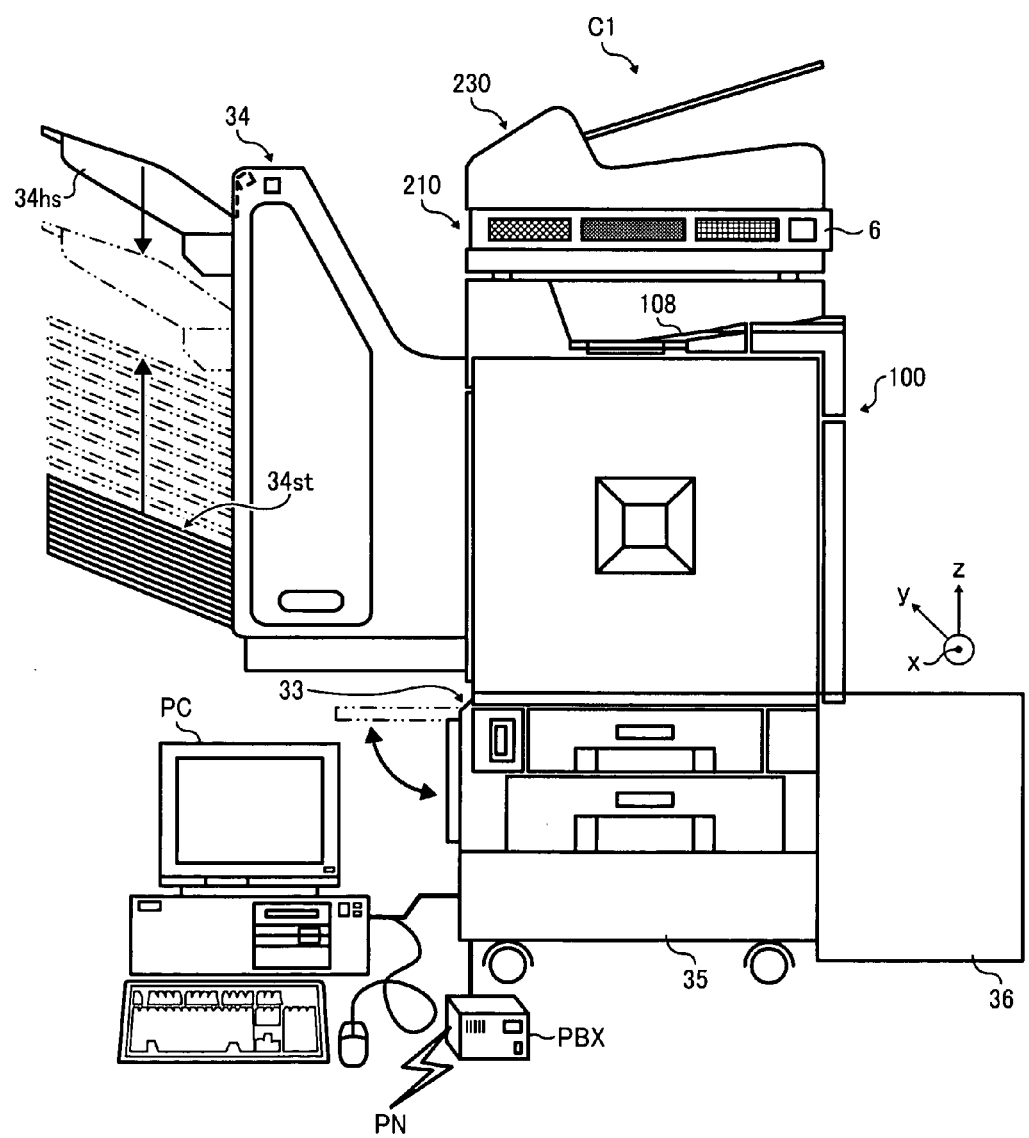
FIG. 1 is a front view illustrating an outer appearance of an image forming apparatus according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, a structure of an image forming apparatus C1 is explained according to an example embodiment of the present invention. The image forming apparatus C1 of FIG. 1 is implemented by a full color digital copier capable of performing a plurality of functions including scanning, copying, printing, fax transmission or reception, and data transmission or reception. Alternatively, the image forming apparatus C1 of FIG. 1 may be implemented by any desired apparatus or system capable of applying concealing processing to image data when the image data is detected to contain specific information indicating that output of the image data is prohibited. The examples of the image forming apparatus C1 include, but not limited to, one or any combination of a scanner, personal computer, printer, copier, and facsimile. For the descriptive purpose, in this example, the image forming apparatus C1 of FIG. 1 may be referred to as the copier C1. The copier C1 of FIG. 1 mainly includes an automatic document feeder (ADF) 230, an operation unit 6 such as an operation board, a scanner 210 such as a color scanner, a printer 100 such as a color printer, and a sheet feed bank 35. The printer 100 is connected to a finisher 34, which may be optionally provided to provide a finishing operation such as stapling and includes one or more trays for mounting thereon the recording sheet output from the copier C1 such as a slidable tray 34*hs* and sorting trays 34*st*. The printer 100 may be further provided with a double-sided printing drive unit 33 and a large amount feed tray 36, each of which may be optionally provided.

The copier C1 further includes a network interface (I/F) 10 (FIG. 2), which is connected to a local area network (LAN) and further to a personal computer (PC). The copier C1 as well as the PC may be connected to a wide area communication network such as the Internet through a router provided on the LAN. In this example, the LAN may be any desired wired or wireless network, which may be in compliance with the Ethernet, USB, and IEEE. The copier C1 further includes a facsimile control unit (FCU), which is connected through an exchange device (PBX) to a public switch telephone network PN. The printed sheet output from the printer 100 of the copier C1 is output onto a sheet discharge tray 108 provided above the printer 100 or onto one of trays of the finisher 34.

In example operation, when an original document is placed onto an exposure glass of the scanner 210, the scanner 210 uses its image reading mechanism to convert the original document into image data. This may be referred to as the flat bed reading method. In another example, when an original document is placed onto a document tray of the ADF 230, the ADF 230 feeds the original document to an image reading section of the scanner 210. The original document then passes the image reading section of the scanner 210 and discharged onto a discharge tray provided below the document tray of the ADF 230 by a discharge roller. In this example, the discharge tray functions as a pressure plate, which presses the original document against the exposure glass. When the original document passes through the image reading section, the scanner 210 converts the original document into the image data. This may be referred to as the sheet through reading method.

The printer 100 is implemented by a laser printer. The printer 100 includes four image forming units which respectively form a magenta color toner image, cyan color toner image, yellow color toner image, and black color toner image and are arranged side by side in this order in the recording sheet transferring direction, which is indicated by the direction "y" directing from the lower right to the upper left of FIG. 1. The printer 100 is thus implemented by a full color image forming device of four drum type. The image forming units of magenta (M), cyan (C), yellow (Y), and black (K) are each provided with a photoconductor unit including a photoconductive drum, and a developing unit. The image forming units are arranged such that the rotational axes of the photoconductive drums of the photoconductor units are arranged so as to be in parallel with the horizontal line x or with the main scanning direction and to be apart from each other for a predetermined distance in the recording sheet transferring direction y.

In addition to the image forming units, the printer 100 includes a light exposure unit capable of scanning the laser light, a sheet feeding cassette, a registration roller pair, and a transfer belt unit including a sheet transfer belt that transfers the recording sheet to the image transfer sections of the image forming units, the sheet discharge tray 108, the double-sided printing drive unit 33, etc. The printer 100 further includes a manual sheet feed tray, a toner supply container, and a waste toner bottle, etc.

The light exposure unit of the printer 100 includes a light irradiating device, a polygon mirror, an f-theta lens, a reflective mirror, etc. The light exposure unit irradiates and scans the laser light beam in the main scanning direction x, which is perpendicular to the paper surface, toward the surface of each of the photoconductive drums of the image forming units according to the image data obtained by the scanner 210.

The recording sheet fed from the sheet feeding cassette is guided by a sheet transfer guide and transferred by a sheet transfer roller to be sent to the registration roller pair. The registration roller pair transfers the recording sheet to the sheet transfer belt at a predetermined timing. The sheet transfer belt transfers the recording sheet through the image transfer sections of the image forming units of the respective colors. The photoconductive drums of the image forming units are respectively formed with the toner images of M, C, Y, and K. At the image transfer sections, the toner images are respectively transferred from the surfaces of the photoconductive drums to the recording sheet that is transferred by the sheet transfer belt. More specifically, the toner images are transferred directly onto the recording sheet. The recording sheet having the full-color composite image formed thereon is transferred to a fixing unit. While being transferred through the fixing unit, the full-color composite image is fixed onto the recording sheet. The recording sheet having the fixed image thereon is discharged onto the sheet discharge tray 108 or one of the trays of the finisher 34. Alternatively, the recording sheet having the fixed image thereon may be transferred to the double-sided printing drive unit 33 in the case of double-sided printing.

As described above referring to FIG. 1, the image forming units are each provided with the photoconductor unit and the developing unit. In addition to the photoconductive drum, the photoconductor unit includes a brush roller that applies the lubricant to the surface of the photoconductive drum, a swinging blade that cleans the surface of the photoconductive drum, a discharge lamp that irradiates the light onto the surface of the photoconductive drum, a charging roller of non-contact type that uniformly charges the surface of the photoconductive drum, etc. For each of the image forming units, the charging roller, which is applied with the alternating electric current, uniformly charges the surface of the photoconductive drum. The laser exposure unit irradiates and scans the laser beam, which is modulated according to the image data, i.e., the print data, and deflected by the polygon mirror, to form the electrostatic latent image on the charged surface of the photoconductive drum. The latent image formed on the surface of the photoconductive drum is developed into the toner image with the toner supplied by the developing unit. At the image transfer section through which the recording sheet carried by the sheet transfer belt is transferred, the toner image is transferred from the surface of the photoconductive drum to the recording sheet. After the toner image is transferred, the surface of the photoconductive drum is applied with a predetermined lubricant by the brush roller, and further cleaned by the blade. The discharge lamp irradiates the light onto the surface of the photoconductive drum to be discharged to prepare for forming of an electrostatic latent image.

The recording sheet, which is transferred from the printer 100 to the finisher 34, is transferred in the upper left direction to the reverse U shape transfer path. As it passes the reverse U shape transfer path, the transfer direction of the recording sheet is switched from the upper left direction to the downside direction. According to the image forming mode, which may be set through the operation unit 6 or set by default, the recording sheet is discharged onto one of the trays of the finisher 34. For example, when the stacker discharge mode is selected, the recording sheet is discharged onto the slidable tray 34*hs* through a discharge port. When the sorter discharge mode is selected, the recording sheet is discharged onto one of the sorting trays 34*st*, which is previously assigned.

Figure 2:
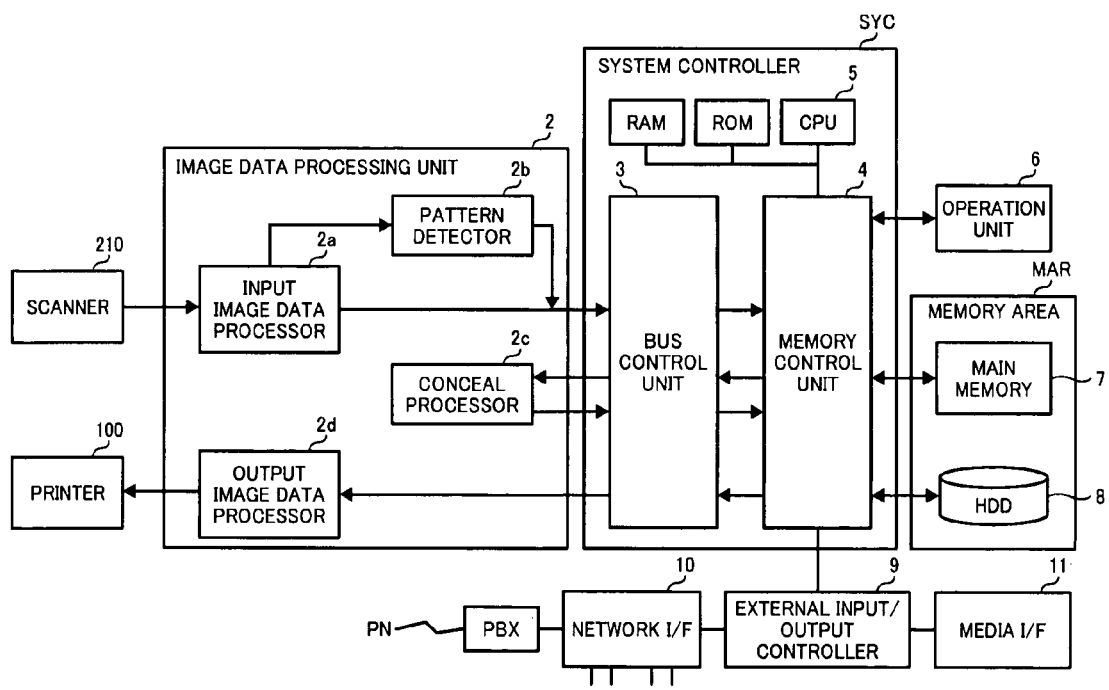
FIG. 2 is a schematic block diagram illustrating a structure of an image processing system of the image forming apparatus of FIG. 1.

Referring to FIG. 2, a structure of an image processing system of the copier C1 is explained according to an example embodiment of the present invention. The copier C1 further includes an image data processing unit 2, which is connected to the scanner 210 and the printer 100. The image data processing unit 2 includes an input image data processor 2*a*, an output image data processor 2*d*, a pattern detector 2*b* for detecting whether the image data contains specific information, and a conceal processor 2*c* for applying concealing processing to the image data when the specific information is detected in the image data. The input image data processor 2*a* may apply various image processing to the input image data output from the scanner 210 to remove the undesired characteristics that may be caused in the image data at the time of scanning. Such image processing may include, for example, scanner gamma correction, filter processing, and background density adjustment such as removing the background color from the image data. The output image data processor 2*d* may apply various image processing to the image data to be output to the printer 100 including, for example, color adjustment such as color space conversion from RGB image data to YMCK image data, scaling such as image size enlargement or image size reduction, image editing, printer gamma correction, and image quality processing such as tone processing. Further, the output image data processor 2*d* may perform addition of specific information to the image data. As described below, the specific information may be added in the form of a pattern image.

The pattern detector 2*b* detects the specific information, such as the pattern image, in the image data read by a charged coupled device (CCD) of the scanner 210.

The copier C1 further includes a system controller SYC, which includes a central processing unit (CPU) 5, a read only memory (ROM), a random access memory (RAM), a bus control unit 3, and a memory control unit 4. The bus control unit 3, which is provided between the image data processing unit 2 and the memory control unit 4, controls the assignment or use of a data line, through which the image data is transferred. Further, the bus control unit 5 controls communication between the CPU 5, and at least one of the memory control unit 4 and the image data processing unit 2. The bus control unit 5 further performs primary image compression or expansion on the image data.

The memory control unit 4 provides a plurality of functions including, for example, access control, memory control, compression or expansion, image editing, bus control, port control, and network control. The memory control, compression or expansion, image editing, bus control, port control, and network control are respectively connected to the access control via a direct memory access control (DMAC).

The copier C1 further includes a memory area MAR including a main memory 7 and a hard disk drive (HDD) 8. Under control of the CPU 5, the main control unit 4 may perform various functions related to the access to the main memory 7 or the HDD 8 including, for example, access control for the image data, deploying the print data for use in the PC connected through the LAN, secondary compression or expansion of the image data for the effective use of the memory space of the main memory 7 or the HDD 8, and transfer of the image data to the PC or a memory card. For example, the memory control unit 4 applies secondary compression to the primary compressed image data, which is compressed by the bus control unit 3 and sent by the bus control unit 3, and stores the secondary compressed image data onto the memory 7 or the HDD 8. The secondary compressed image data may be read out from the memory 7 or the HDD 8 as needed. The secondary compressed image data that has been read may be expanded into the primary compressed data, and sent from the memory control unit 4 to the bus control unit 3. The bus control unit 3 expands the primary compressed data into the image data, and outputs the image data through the image data processing unit 2 to the printer 100.

The memory control unit 4 may perform the function of compressing or decompressing using any known method. For example, when the compressed image data is obtained through facsimile, PC, or medium such as memory card, such compressed image data may be decompressed using the memory control unit 4. Alternatively, the memory control unit 4 may sequentially perform compression on the one-page image data, the line image data, and the dot image data, as it is generated within the copier C1. The copier C1 further includes an external input/output controller 9, the network I/F 10, and a medium I/F 11. The medium I/F 11 functions as an interface between the copier C1 and a recording medium such as a SD card, a USB memory, an optical disc such as a CD-ROM, etc. When the copier C1 sends the image data to an external apparatus such as a facsimile apparatus, a network server, the PC, a memory card, etc., through the external input/output controller 9, the network I/F 10, or the medium I/F 11, the memory control unit 4 may use the function of compressing to compress the image data. The memory control unit 4 may be further provided with the function of performing the primary compression or expansion, which may be applied by the bus control unit 3 as described above. For example, the memory control unit 4 may read out the secondary compressed image data from the main memory 7, expand the secondary compressed image data into the primary compressed image data, and further expand the primary compressed image data into the image data. The image data that is expanded may be deployed on the main memory 7.

The CPU 5 of the system controller SYC, which functions as a main processor of the copier C1, controls operation of each unit in the copier C1. The CPU 5 further controls reading or writing of data other than the image data including, for example, various programs, control data, reference data, a conversion table such as a look up table (LUT), which may be stored in the HDD 8.

The operation unit 6 sends an instruction to the CPU 5 according to a user input made by the user. For example, the operation unit 6 may input information regarding the type of processing to be performed such as copying, fax transmission, image data transfer, image data reading, printing, etc. In another example, the operation unit 6 may input information regarding the number of recording sheets to be processed. According to the user input with respect to the operation unit 6, the operation unit 6 may perform various operations including, for example, detecting of the ten key that has been pressed and generating numerical data according to the detection, detecting of the start key that has been pressed and sending the instruction for starting to the CPU 5, and detecting the key that instructs the change of the recording sheet size. In addition to detecting the user input, the operation unit 6 may control the display of the operation unit 6 according to the user input. Through the operation unit 6, the user is able to input control information regarding the image data to be processed.

The memory control unit 4 further provides the function of network control, which controls the connection with the LAN or the Internet. For example, the network control function controls data transmission or reception with respect to an external apparatus connected to the copier C1 through the network. For example, the HDD 8 may be stored with setting information regarding a server such as a www server, FTP server, SMTP server, DHCP server, document server to be used for filing, and mail server to be used for email transmission or reception, etc. Based on the setting information, the memory control unit 4 performs transmission or reception of the file or the email through the external input/output controller 9, which is connected to the LAN or the Internet. The memory control unit 4 may further store information regarding the generation of the file to be transmitted or regarding the addition of the received file into a directory. The CPU 5 may control the network interface of the memory control unit 4. For example, the CPU 5 may instruct the memory control unit 4 to generate the file to be transmitted, to generate the directory regarding the destination to which the file is to be transmitted, or to send the file to the destination, according to a command regarding reading or sending the image data received from the user through the operation unit 6 or the PC.

The access control function of the memory control unit 4 is controlled under the CPU 5 according to a command received from the user. The access control function controls the access to the memory 7 or the HDD 8 from an external unit. The image data output by the scanner 210 is transferred, through the image data processing unit 2 and the bus control unit 3, to the memory control unit 4 under control of the CPU 5. The access to the image data input to the memory control unit 4 is not controlled by the CPU 5, but controlled by the DMAC of the memory control unit 4. The access control function of the memory control unit 4 arbitrates a plurality of requests for accessing the memory 7 or the HDD 8 that may be received from a plurality of units. The memory control unit 4 further provides a memory control function, which controls accessing to the main memory 7 or the HDD 8, and reading or writing of the image data onto or from the main memory 7 or the HDD 8.

When the image data is input to the memory control unit 4 through the network, the image data is transferred to the memory 7 or the HDD 8 under control of the DMAC. The access control function of the memory control unit 4 arbitrates the access to the memory 7 or the HDD 8, which may be made through the network, among a plurality of jobs. The memory control function of the memory control unit 4 controls reading or writing of the image data onto or from the main memory 7 or the HDD 8.

When the image data is input to the memory control unit 4 through a port from the serial bus, the image data is transferred to the main memory 7 or the HDD 8 under control of the DMAC. When the print data for output is received through the network or directly from the PC connected to the copier C1, the CPU 5 converts the print data to the image data using the font data, and deploys the image data on the memory area of the main memory 7 or the HDD 8.

The CPU 5 further controls the interface with the external unit. The DMAC controls the access to the image data input to the memory control unit 4, for example, when the image data is to be transferred. Since each DMAC performs data transfer independently, the access control function prioritizes the job or the request that needs to access the main memory 7 or the HDD 8 to prevent the job or the request to be in conflict with each other.

Figure 3:
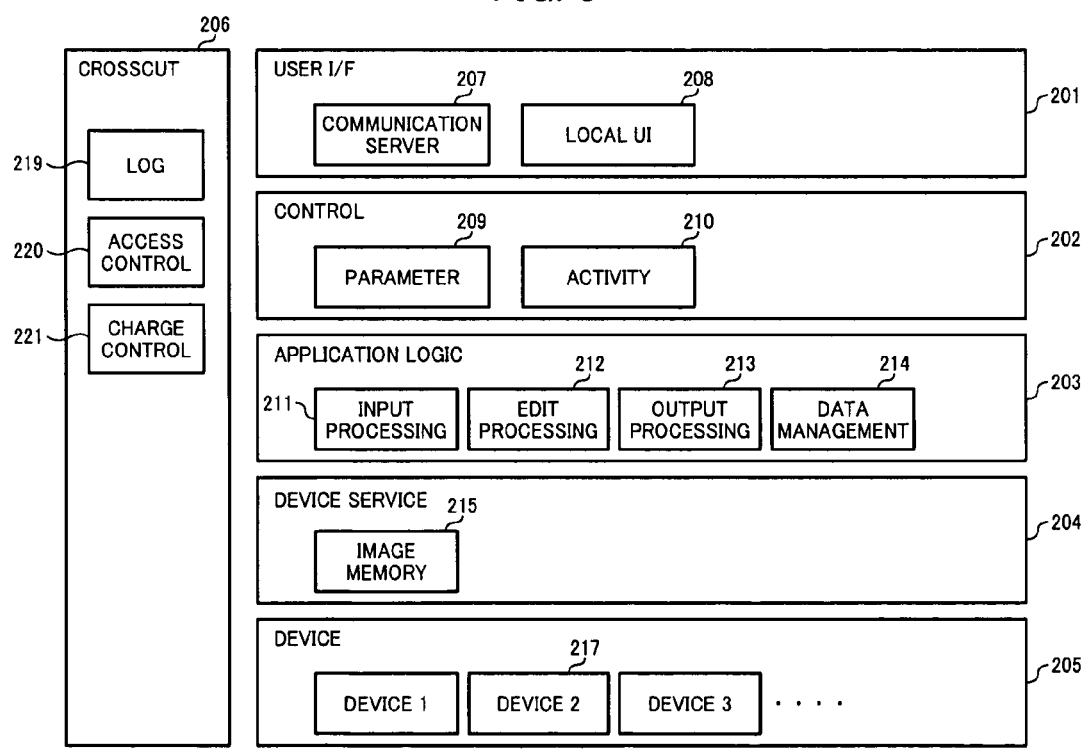
FIG. 3 is a schematic block diagram illustrating a software structure of the image forming apparatus of FIG. 1, which may be used to control an system controller, a process controller, an image forming device, and a circuit of the image forming apparatus of FIG. 1.

Referring to FIG. 3, a software structure of the copier C1 is explained according to an example embodiment of the present invention. The copier C1 includes a user I/F 201, a control 202, an application logic 203, a device service 204, a device 205, and a crosscut 206.

When a user instruction is received from the external apparatus, the user I/F 201 analyzes the user instruction to generate an instruction that is sent to the control 202. The user I/F 201 includes a local UI 208 block that receives the instruction with respect to the operation unit 6 of the copier C1, and a communication server block 207 that receives the instruction received through the network such as from the PC. When the control 202 receives the instruction from the user I/F 201, the control 202 stores the instruction in a parameter 209. The control 202 uses an activity 210 to select a component that is needed for performing the user's request that is indicated by the instruction, from a plurality of components stored in the application logic 203. When the component is selected, the control 202 requests the selected component to perform the user's request.

The application logic 203 stores the plurality of components each capable of performing the function requested by the user. In this example illustrated in FIG. 3, the plurality of components includes input processing 211, edit processing 212, output processing 213, and data management 214. Any other component may be added. According to the instruction received from the control 202, the application logic 203 causes one or more of a plurality of processing to be performed using the selected one of the functional blocks of the application logic 203. The device 205 includes a plurality of hardware control components for a hardware that actually performs the processing. The hardware control component may control a specific device such as the network, the telephone communication line, or a device connected to the copier C1 such as the scanner 210. The crosscut 206 includes a plurality of functional blocks each may be commonly used by all of the functional blocks. For example, the crosscut 206 includes a log 219 storing the log information, which may be accessed by all the blocks each of which needs to have the log information. Additionally, in this example, the crosscut 206 includes an access control 220 and a charge control 221.

Figure 4:
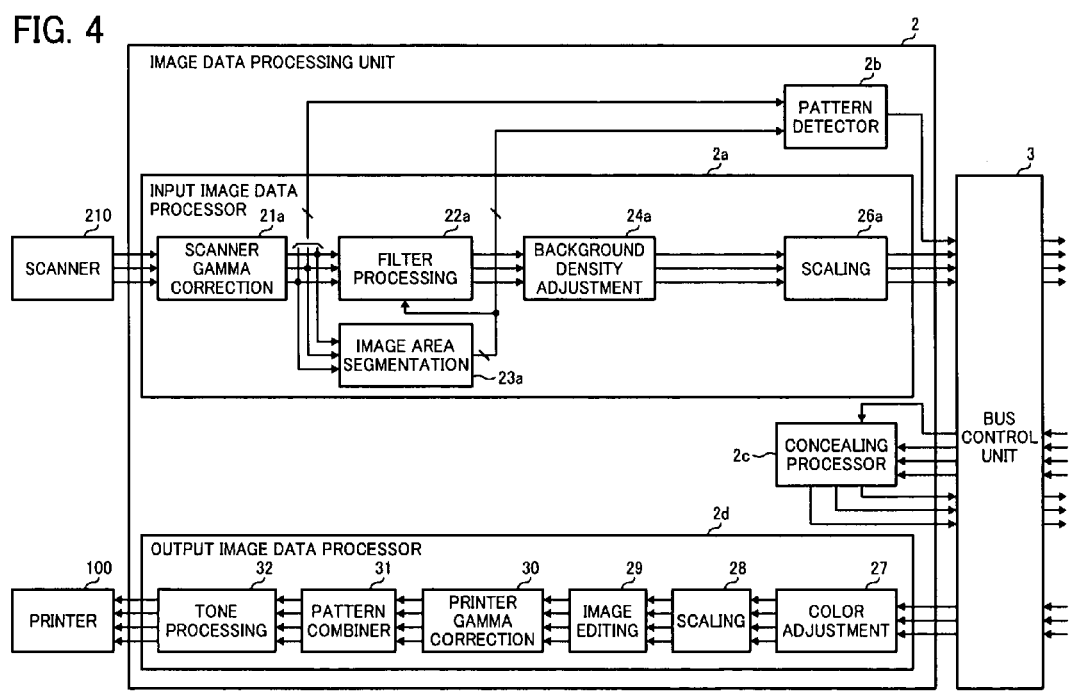
FIG. 4 is a schematic block diagram illustrating a functional structure of an image data processing unit of FIG. 2, according to an example embodiment of the present invention.

Referring to FIG. 4, a functional structure of the image data processing unit 2 is explained according to an example embodiment of the present invention. The image data processing unit 2 includes the input image data processor 2a and the output image data processor 2d. The input image data processor 2a may apply processing to the image data, such as the RGB image data, output from the scanner 210 to improve the image quality of the image data. The pattern detector 2b may detect specific information such as the pattern image in the image data processed by the input image data processor 2a. The output image data processor 2d may convert the image data, which is processed by the input image data processor 2a, to print data to cause the print data to match the image characteristics of the printer 100 or to improve the image quality of the print data. The output image data processor 2d may further add the specific information, such as the pattern image, to the image data using a pattern combiner 31.

The input image data processor 2a includes scanner gamma correction 21a, image area segmentation 23a, filter processing 22a, background density adjustment 24a, and scaling 26a. The scanner gamma correction 21a corrects or adjusts the tone characteristics of the image data. The image area segmentation 23a determines whether a portion of the image data corresponds to a character area or a non-character area to generate a determination result, which may be used to detect the image characteristics of the image data or to segment the image into sections. The filtering processing 22a applies filtering, such as image enhancement or image smoothing, to the portion of the image data according to the determination result of the image area segmentation 23a. In this example, as described above, the image area segmentation 23a detects the character area and the non-character area in the image data. The non-character area may correspond to a picture area. The portion of the image data not belonging to either one of the character area or the non-character area is determined as the background section.

The output image data processor 2d includes color adjustment 27, scaling 28, image editing 29, printer gamma correction 30, and tone processing 32. The color adjustment 27 performs color space conversion from the RGB image data to the YMCK image data. The output image data processor 2d further includes the pattern combiner 31, which adds the specific information such as the pattern image to the image data.

The image data processing unit 2 further includes the conceal processor 2c, which conceals the contents of the image data in which the specific information is detected by the pattern detector 2b by making the contents of the image data to be the solid black image. When the image data contains no specific information, such concealing processing is not performed. The structure or function of the conceal processor 2c is explained below referring to FIG. 10.

Figure 5:
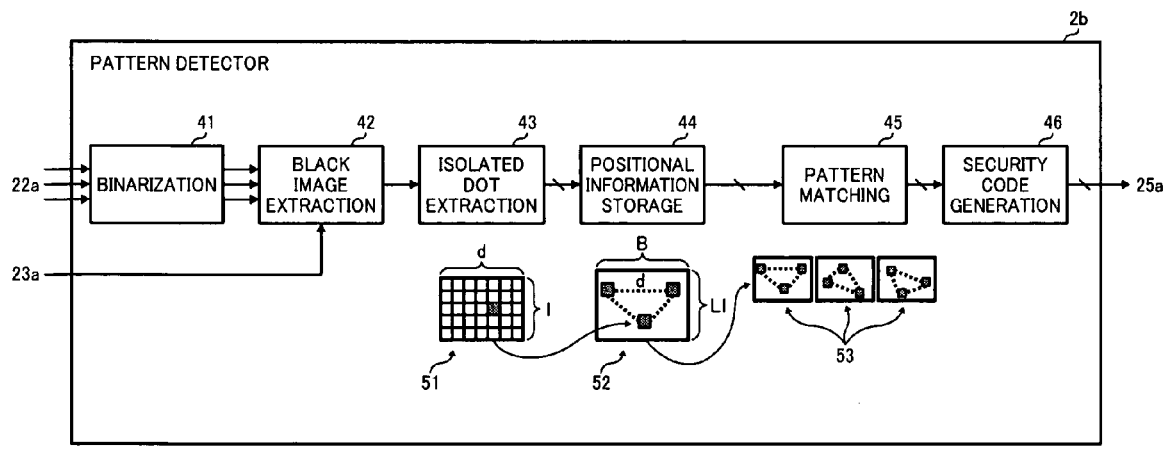
FIG. 5 is a schematic block diagram illustrating a functional structure of a pattern detector of FIG. 4.

Referring to FIG. 5, a functional structure of the pattern detector 2b is explained according to an example embodiment of the present invention. The pattern detector 2b includes binarization 41, black image extraction 42, isolated dot extraction 43, positional information storage 44, pattern matching 45, and security code generation 46. The binarization 41 binarizes the RGB image data generated by the scanner gamma correction 21a, which may be filtered by the filtering processing 22a to generate the binarized RGB image data. The black image extraction 42 extracts the black image from the background section of the binarized RGB image data. The isolated dot extraction 43 detects an isolated image pixel in the black image, which could be found in the block area defined by the d pixels in the main scanning direction times the l line in the sub-scanning direction, which may be referred to as the (d×l) block area. The isolated pixel may be detected for the number B of the d pixels and the number L of the l lines. Thus, the isolated pixel is detected in the area defined by the d pixels times B in the main scanning direction, times, the l line times L in the sub-scanning direction, which may be referred to as the (Bd×Ll) block area. The positional information storage 44 stores the positional information of the isolated pixel detected in the (d×l) block area within the (Bd×Ll) block area. The pattern matching 45 determines whether the positional information of the isolated pixel in the (Bd×Ll) block area stored in the positional information storage 44 matches the positional information of one of a plurality of reference patterns that is previously stored in the positional information storage 44 as a first group pattern. The plurality of reference patterns may be provided for more than one type. When the pattern matching 45 determines that the positional information of the isolated pixel matches the positional information of one of the reference patterns, the pattern matching 45 determines that the image data includes the specific information to generate the detection result indicating that the specific information is detected. The detection result is output to the memory control unit 4. The security code generation 46 generates a security code based on the specific information that is detected, i.e., the pattern image that is detected.

Figure 6:
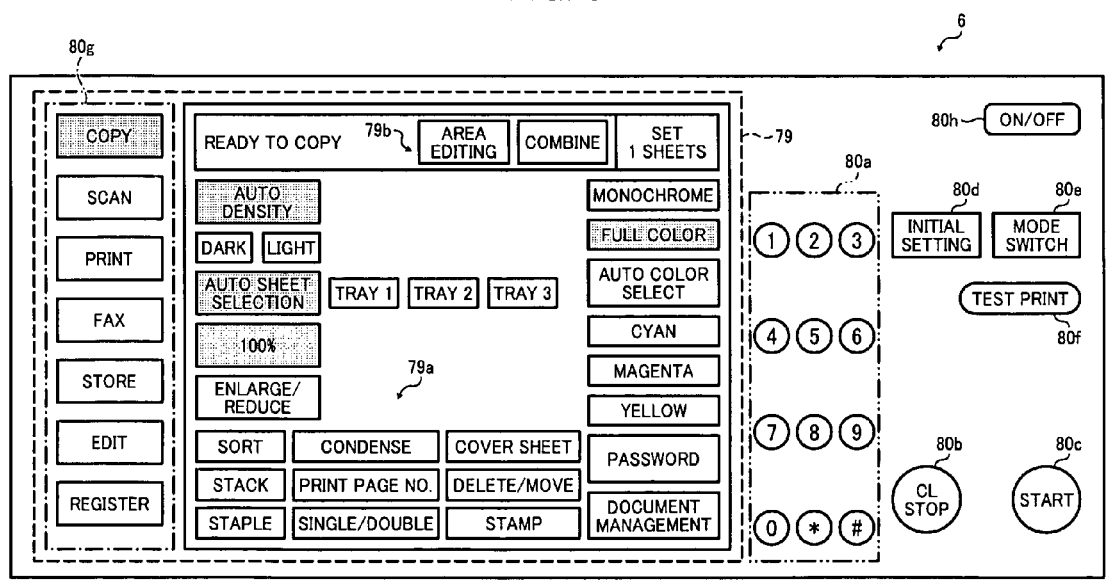
FIG. 6 is a plan view illustrating an enlarged section of a portion of an operation unit of FIG. 1.

Referring to FIG. 6, a structure of the operation unit 6 is explained according to an example embodiment of the present invention. The operation unit 6 includes a touch panel screen 79 that may be implemented by a liquid crystal display (LCD), a ten key 80a, a clear/stop key 80b, a start key 80c, an initial setting key 80d, a mode switch key 80e, a test print key 80f, and a power on/off key 80h. The test print key 80f prints one recording sheet despite the number of sheets to be printed to allow the user to check the printed output. The initial setting key 80d may be selected to allow the user to customize the initial setting of the copier C1. For example, the size of the recording sheet stored in the copier C1 or the initial setting that is always recalled by the copier C1 when the reset key is pressed may be set. When the initial setting key 80d is selected, a plurality of functional buttons may be displayed for selection by the user including, for example, the button that allows the user to set the initial value, the button that allows the user to register the password, the button that allows the user to register or set the copyright information, and the button that allows the user to output the usage of the copier C1. Further, through the initial setting key 80d, the user may select the application that will be firstly selected by the copier C1 when the copier C1 does not receive any user instruction for a predetermined time period. Further, through the initial setting key 80d, the user may set a specific time period that causes, when the specific time period passes, the copier C1 to automatically switch to the sleep mode in which the electric power consumption is reduced or automatically turn off, according to the Energy Star standard.

The touch panel screen 79 displays thereon various functional keys and/or a message indicating the status of the copier C1. For example, the touch panel screen 79 displays a plurality of function keys 80g for selection by the user including the copy function key, the scan function key, the print function key, the fax function key, the store function key, the edit function key, and the register function key. The store function key is provided to allow the user to store the image data, which may be read by the scanner 210 or received from the facsimile apparatus or the PC, onto the memory such as the HDD 8. The register function key is provided to store information in a specific area of the HDD 8. For example, the register function key may store information regarding the image data stored in the HDD 8 such as information indicating that the image data is commonly used by the general user, information indicating that the image data is to be stored for a long time, or information indicating that the image data is to be managed with the special care.

The touch panel screen 79 displays thereon a screen that corresponds to the selected one of the plurality of function keys 80g. For example, when the copy function key 80g is elected, as illustrated in FIG. 6, the touch panel screen 79 displays functional keys 79a, 79b, a message indicating the number of processed sheets, and a message indicating the status of the copier C1. When the user touches one of the keys displayed on the touch panel screen 79, the selected key may be darkened. When the user desires to input detailed setting information, such as information indicating the printing type, the user may select one of the keys to change the contents of the touch panel screen 79. The touch panel screen 79, which is implemented by a dot display device, is capable of changing the graphical information as needed.

Figure 7:
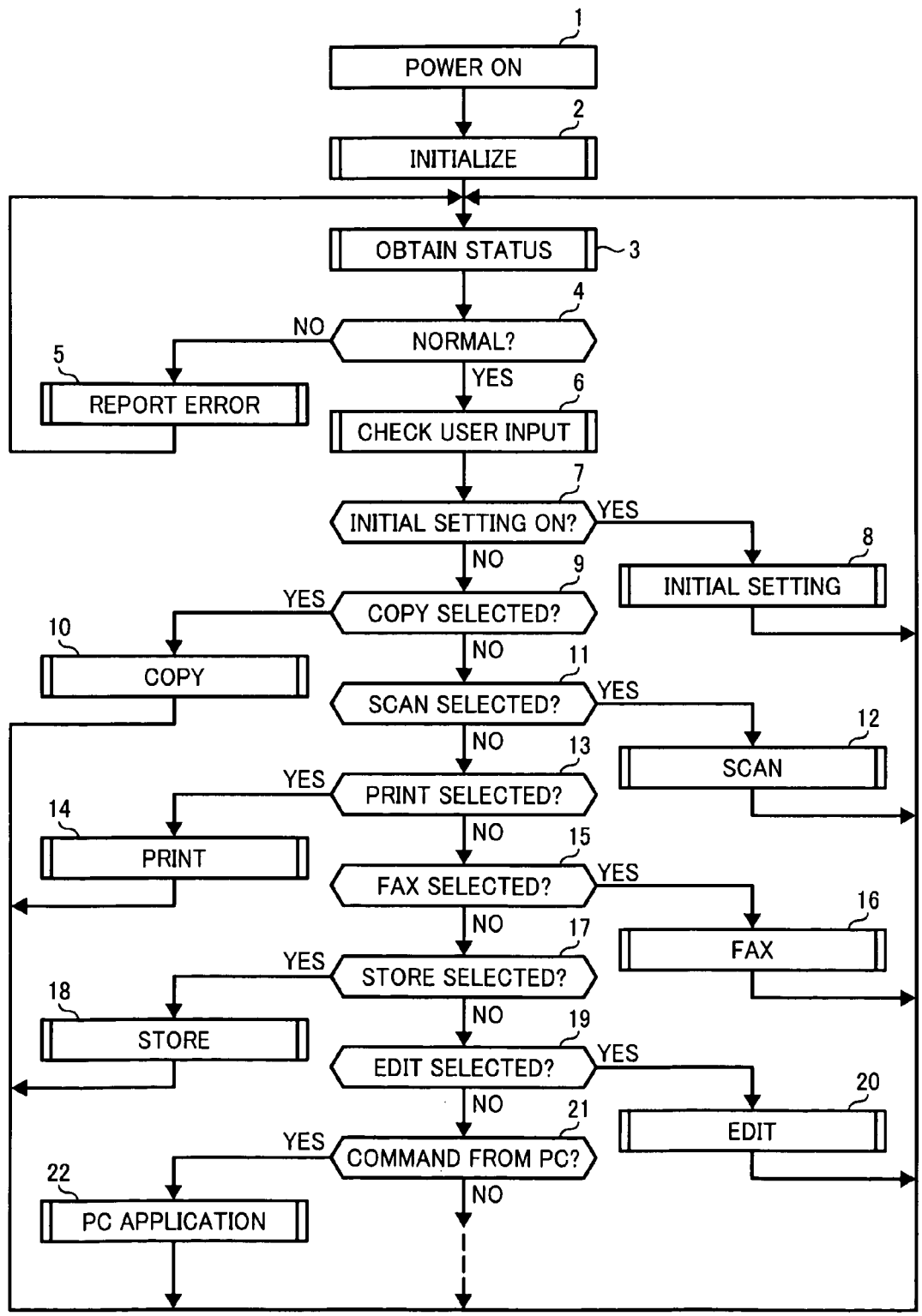
FIG. 7 is a flowchart illustrating operation of performing a request received from a user, performed by the image forming apparatus of FIG. 1, according to an example embodiment of the present invention.

Referring to FIG. 7, operation of controlling image processing according to a user instruction received from the user through the operation unit 6 or through the PC, performed by the copier C1, is explained according to an example embodiment of the present invention. The operation of FIG. 7 may be performed by the CPU 5 of the system controller SYC of FIG. 2 according to an image processing control program stored in the ROM.

At 1, the operation electric voltage is supplied to the copier C1 as the copier C1 is turned on. At 2, the CPU 5 clears the output port, and initializes the internal memory and the register of the copier C1. At 3, the CPU 5 obtains information regarding the status of each unit of the copier C1. At 4, the CPU 5 determines whether each unit normally operates. When the abnormality is detected in at least one unit ("NO" at 4), the operation proceeds to 5 to report to the user through displaying a message on the operation unit 6, and returns to 3. When the abnormality is not detected ("YES" at 4), the operation proceeds to 6.

At 6, the CPU 5 waits for a user instruction, which may be received through the operation unit 6 as a user input or an external apparatus such as the PC or a facsimile apparatus as a command or a request.

At 7, the CPU 5 determines whether the initial setting key 80d is selected when the CPU 5 detects the selection of the initial setting key 80d on the operation unit 6 ("YES" at 7), the operation proceeds to 8 to cause the operation unit 6 to perform the initial setting. For example, at 8, the operation unit 6 displays an initial setting menu screen on the touch panel screen 79. The menu screen displays a user registration item for selection by the user. When the user selects the user registration item, the touch panel screen 79 displays an input screen that requests the user to input the password of the administrator of the copier C1. When the user inputs the administrator's password, the operation unit 6 displays a user registration input screen on the touch panel screen 79. Through the user registration input screen, the user may register any desired number of users by inputting a set of user name and password. The user registration information, which is the set of user name and password, is stored in a nonvolatile memory of a user registration device that is provided in the copier C1.

Figure 8:
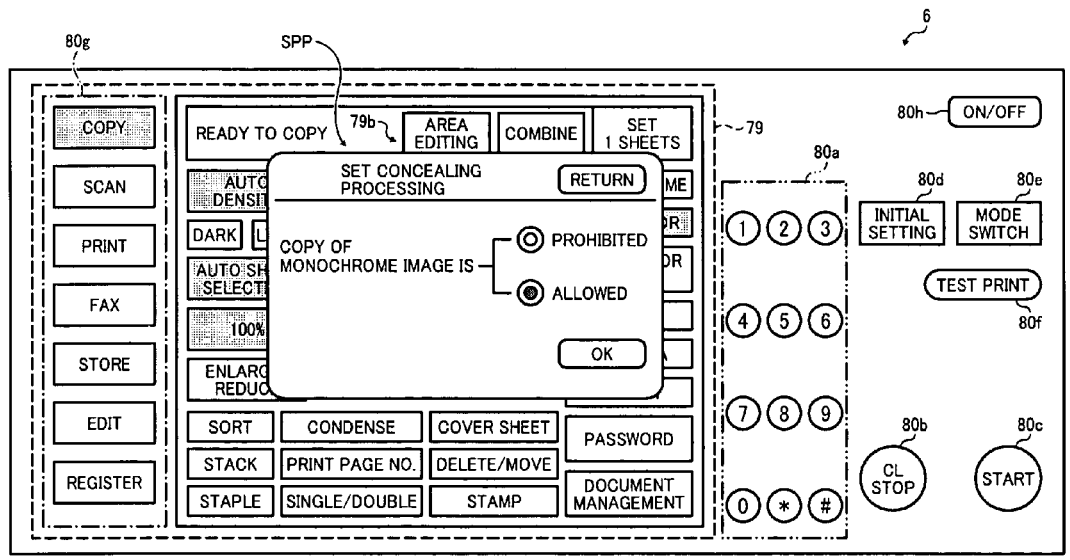
FIG. 8 is a plan view illustrating an input screen displayed on a display section of the operation unit of FIG. 1 when a concealing processing setting option is elected.

The initial setting menu screen may also include a conceal processing setting item for selection by the user. When the user selects the conceal processing setting item, the operation unit 6 displays a conceal processing setting screen SPP on the touch panel screen 79 as illustrated in FIG. 8. The conceal processing setting screen SPP allows the user to select one of the "prohibited" option and the "allowed" option for copying of a monochrome image. Information regarding the option that has been selected by the user is stored in an initial setting table, which may be provided in a specific area of the nonvolatile memory of the operation unit 6. More specifically, register data regarding the conceal processing setting, which is stored in the initial setting table, is overwritten. The register data, which is overwritten, may be referred by the conceal processor 2b at S11 of FIG. 10.

Referring back to FIG. 7, at 9, the CPU 5 determines whether the copy function key 80g is selected. When the user selects the copy function key 80g from the plurality of function keys 80g displayed on the touch panel screen 79 ("YES" at 9), the LCD 79 displays a copy mode input screen. In such case, the operation proceeds to 10 of FIG. 7 to perform copying according to a user instruction input through the copy mode input screen. When the copy function key 80g is not selected ("NO" at 9), the operation proceeds to 11.

When the user selects the scan function key 80g from the plurality of function keys 80g displayed on the touch panel screen 79 ("YES" at 11), the LCD 79 displays a scan mode input screen. In such case, the CPU 5 of the system controller SYC performs 12 of FIG. 7 to perform operation of scanning according to a user instruction input through the scan mode input screen. When the scan function key 80g is not selected ("NO" at 11), the operation proceeds to 13.

When the user selects the print function key 80g from the plurality of function keys 80g displayed on the touch panel screen 79 ("YES" at 13), the LCD 79 displays a print mode input screen. In such case, the CPU 5 of the system controller SYN performs 14 of FIG. 7 to perform operation of printing according to a user instruction input through the print mode input screen. When the print function key 80g is not selected ("NO" at 13), the operation proceeds to 15.

When the user selects the fax function key 80g from the plurality of function keys 80g displayed on the touch panel screen 79 ("YES" at 15), the LCD 79 displays a fax mode input screen, which allows the user to transmit image data, such as the image data of an original document placed on the scanner 210, to a destination apparatus. The CPU 5 of the system controller SYN performs 16 of FIG. 7 to perform operation of faxing according to a user instruction input through the fax mode input screen. When the fax function key 80g is not selected ("NO" at 15), the operation proceeds to 17.

When the user selects the store function key 80g from the plurality of function keys 80g displayed on the touch panel screen 79 ("YES" at 17), the LCD 79 displays a store mode input screen, which allows the user to store image data, such as the image data of an original document placed on the scanner 210, in the HDD 5. The CPU 5 of the system controller SYN performs 18 of FIG. 7 to perform operation of storing according to a user instruction input through the store mode input screen. When the store function key 80g is not selected ("NO" at 17), the operation proceeds to 19.

When the user selects the edit function key 80g from the plurality of function keys 80g displayed on the touch panel screen 79, the LCD 79 displays an edit mode input screen, which allows the user to edit image data, such as the image data read out from the HDD 5. The CPU 5 of the system controller SYC performs 20 of FIG. 7 to perform operation of editing according to a user instruction input through the edit mode input screen. When the edit function key 80g is not selected ("NO" at 19), the operation proceeds to 21.

In this example, the PC connected to the copier C1 is previously installed with an application program, which causes a display device of the PC to display image data scanned by the copier C1 in a substantially similar manner as the operation unit 6 displays image data on the touch panel screen 79. Further, the application program that is installed is capable of receiving information regarding a user instruction input through the PC in a substantially similar manner as the operation unit 6 receives a user instruction. With this application program, the user is able to operate the copier C1 though the PC in a substantially similar manner as the user operates the copier C1 through the operation unit 6. The touch panel screen 79 of the operation unit 6 allows the user to input by the touch input method or the two-dimensional cursor operation method. The PC allows the user to input through a keyboard by the keyboard input method or through a mouse by the two-dimensional cursor operation method. When the application program installed on the PC is executed, an input screen that is similar in contents to the input screen displayed on the touch panel screen 79 may be displayed on the display device of the PC. When the user double-clicks the cursor placed above an input button displayed on the input screen, or the user enters the Enter key while the cursor is placed above the input button, the PC recognizes that the input button is selected by the user, and sends a command indicating the selection of the input button to the system controller SYC of the copier C1. Referring back to 21 of FIG. 7, when the command is received ("YES" at 21), the CPU 5 of the controller SYC proceeds the operation to 22 to perform operation according to the command received from the PC using the application program installed onto the PC. More specifically, according to a request command input by the user, the CPU 5 performs operation of copying, scanning, printing, faxing, storing, or editing in a substantially similar manner as described above.

Referring to FIG. 9, operation of copying performed at 10 of FIG. 7 is explained according to an example embodiment of the present invention. At S1, the operation unit 6 displays the copy mode input screen on the touch panel screen 79 or the display device of the PC. The copy mode input screen requests the user to input a user name and a password. When the user inputs the user name and the password through the operation unit 6 or the PC, or the user inserts the user's IC card to a user authentication device of the copier C1, the operation proceeds to S2 to authenticate the user.

At S2, the CPU 5 checks whether the password obtained from the user matches one of the passwords that have been registered in the copier C1. When it is determined that the obtained password matches one of the registered passwords ("YES" at S3), the operation proceeds to S4. When it is determined that the obtained password does not match any one of the registered passwords ("NO" at S3), the operation returns to S1. At this time, an error message may be displayed.

At S4, the CPU 5 allows the user to set various settings regarding the copying operation through the copy mode input screen. When information regarding the settings is received, the CPU 5 sets the settings according to the information input by the user. More specifically, at S4, the user may place an original document to be processed on the exposure glass of the scanner 210 or the ADF 230. The user may further select a desired copy mode, and instruct the copier C1 to start copying through the operation unit 6 or the PC. Before instructing for starting copying, the user may select to add the specific information. When the CPU 5 detects the user instruction for starting copying at S5 ("YES" at S5), the operation proceeds to S6. When the CPU 5 does not detect the user instruction for starting copying ("NO" at S5), the operation returns to S4.

When the user instruction for starting copying is detected, the operation unit 5 converts the information input by the user as the user instruction to a control command data to issue the control command data. The issued control command data is further notified to the CPU 5. The CPU 5 executes a copy application program to perform a plurality of instructions according to the control command data to sequentially perform operation of setting and performing, etc. as described below.

Assuming that the user instructs the copier C1 to add the specific information through the operation unit 6 before instructing the copying operation, at S7, the operation unit 6 causes the touch panel screen 79 to display one or more information items for selection by the user, which is to be used for generating a security code. The one or more information items include the item for selecting a processed area, the item for selecting a pattern, the item for selecting a color of the pattern, the item for selecting a warning character, etc. The operation unit 6 may display an information input table, which lists the information items for user selection, and the setting value for the information items. In this example, the setting values may be set to 3 by default for all information items, indicating that the item for selecting a processed area is set to non-character area and the character area of the image data, the item for selecting a pattern is set to the solid image, the item for selecting a color is set to blue, and the item for selecting a warning character is set to the message "COPY PROHIBITED". Alternatively, the user may change the default setting values by inputting or selecting the setting values through the information input table.

When the user confirms the contents of the information input table, which may be changed or not changed, the CPU 6 generates a security code based on the setting values of the information input table at the time when the user selects the user instruction for copying. More specifically, the CPU 5 reads out a plurality of types of image data each having a specific type of black dot patterns from the HDD 8 onto the main memory 7. The security code, which is formed as a block including a plurality of patterns (a) to (h) that are arranged in a predetermined order, is divided by half along the central line of the security code. The divided sections of the security code are arranged by two lines. In this example, the bit containing "0" is assigned with a first type dot pattern, while the bit containing "1" is assigned with a second type dot pattern to form a set of dot patterns Ac. The image data having the set of dot patterns Ac is deployed in the main memory 7, and written onto the internal memory of the pattern combiner 31.

At S8, the CPU 5 starts reading the original document provided by the user into the image data by using the CCD. After being applied with shading correction, the image data, which is 8-bit RGB image data, is input to the image data processing unit 2. The input image data processor 2a of the image data processing unit 2 applies various image processing to the image data to remove undesired characteristics that may be caused at the time of scanning. Further, at S9, the pattern detector 2b detects specific information, which is added to the image data as a pattern, in the image data as described above referring to FIG. 5.

Figure 11:
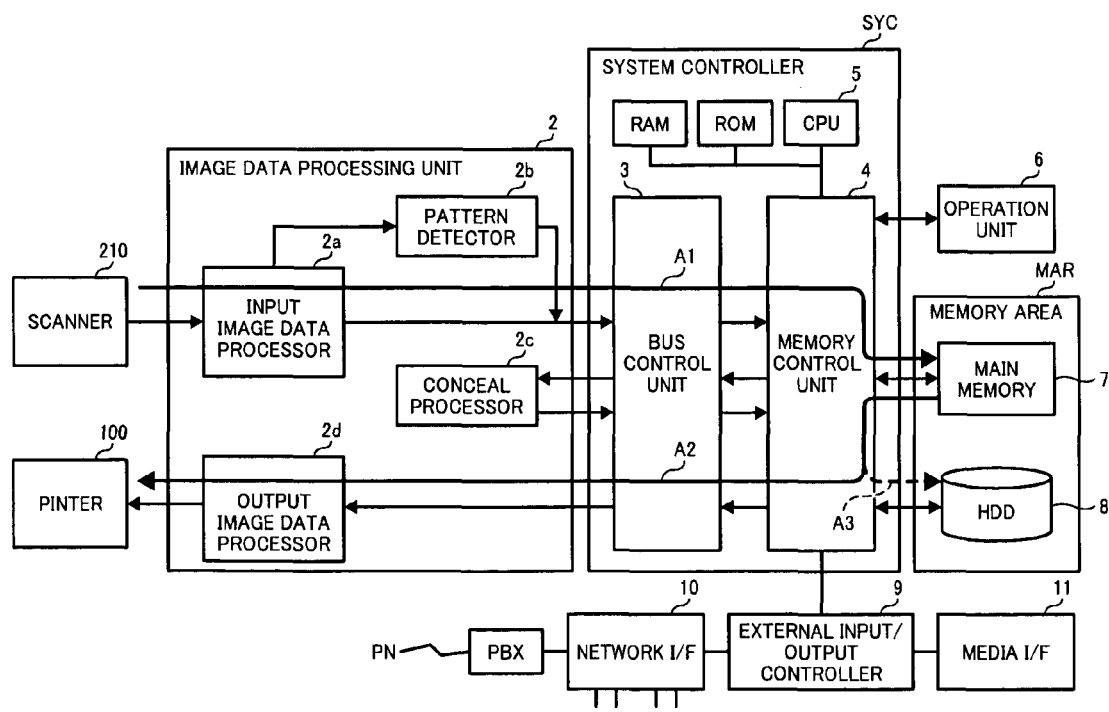
FIG. 11 is a schematic block diagram illustrating the flow of image data in the image processing system of FIG. 2 when the image data, which is not detected to include specific information, is printed after being read by a scanner.

At S10, the RGB image data, which has been processed by the input image data processor 2a and referred to as the primary processed RGB image data, is read out from the main memory 7 while still being stored in the main memory 7, and is output to the output image data processor 2d as indicated by the route A1 and A2 of FIG. 11. When the pattern detector 2b detects the specific information in the image data, the pattern detector 2b sends the detection result indicating that the specific information is found in the image data to the memory control unit 4. The memory control unit 4 stores the detection result of the pattern detector 2b in the internal memory, i.e., a register, of the memory control unit 4. The main control unit 4 outputs the primary processed RGB image data, which is read out from the main memory 7 and to be output to the output image data processor 2d, to the conceal processor 2c through the bus control unit 3. The primary RGB image data processed by the conceal processor 2c, which may be referred to as the secondly processed RGB image data, is output to the output image data processor 2d as indicated by the route A1 and B2 of FIG. 13. More specifically, when the detection result indicating that the specific information is found in the image data is generated by the pattern detector 2, the system controller SYC switches the route for transferring the RGB image data from the route A1 and A2 of FIG. 11 to the route A1 and B2 of FIG. 13. Further, the operation proceeds to S11 to start performing concealing processing on the primary processed RGB image data as described below referring to FIG. 10.

When the original document has been scanned, i.e., when the primary processed RGB image data is stored in the main memory 7 for all sections of the original document, and when the memory control unit 4 stores, in the register, the detection result indicating that the specific information is detected in the image data stored in the main memory 7, at S11, the CPU 5 causes the conceal processor 2c to convert the primary processed RGB image data read out from the main memory 7 to the secondary processed RGB image data. At S12, the CPU 5 compresses the secondary processed RGB image data, and stores the compressed RGB image data in the HDD 8 as indicated by the route A1 and B3 of FIG. 13. At S12, when the memory control unit 4 stores, in the register, the detection result indicating that the specific information is not detected in the image data stored in the main memory 7, the CPU 5 compresses the primary processed RGB image data that is read out from the main memory 7, and stores the compressed RGB image data in the HDD 8 as indicated by A3 of FIG. 11, without applying the concealing processing.

In the example case of sequentially reading a plurality of pages of the original document, S8 to S12 is performed for each page of the original document. Alternatively, in the example case of repeatedly printing the same original document such that more than one printing is performed on one page, the image data of the one page of the original document, which is read out from the HDD 8, is expanded and deployed on the main memory 7, and output to the output image data processor 2d. When the detection result indicates that the specific information is not detected in the image data, the operation is performed as indicated by the route A4 of FIG. 12. When the detection result indicates that the specific information is detected in the image data, the operation is performed as indicated by the route B4 of FIG. 14. Since the image data being stored in the HDD 8 has been generated based on the detection result, operation of detecting and applying concealing processing does not have to be performed.

In either one of the case in which the image data of the original document is printed for the first time as described above referring FIG. 11 and FIG. 13, and the case in which the image data of the original document is printed repeatedly as described above referring to FIG. 12 and FIG. 14, when the addition of the specific information is instructed ("YES" at S14), at S15, the pattern combiner 31 of the output image data processor 2d (FIG. 4) detects a character area and non-character area of the image data, adds the pattern image data to a background section of the image data that is determined to be the area other than the character and non-character areas, and combines the image data with the background section.

Referring to FIG. 10, S11 of applying concealing processing is explained according to an example embodiment of the present invention. In this example, when the user instruction input through the operation unit 6 indicates that copying of the monochrome image is prohibited ("YES" at S21), the operation proceeds to S22. At S22, the CPU 5 sets the conceal processor 2c to apply concealing processing to the G image data, which is obtained from the RGB image data that is scanned. More specifically, the conceal processor 2c converts the G image data, which is set to be processed, to the solid image. When the user instruction input through the operation unit 6 indicates that copying of the monochrome image is allowed ("NO" at S21), the operation proceeds to S23. At S23, the CPU 5 sets the conceal processor 2c to apply concealing processing to the R image data, which is obtained from the RGB image data that is scanned. More specifically, the conceal processor 2c converts the R image data, which is set to be processed, to the solid image. In this example, the painting level of the solid image may be set to a maximum value. Alternatively, the painting level of the solid image may be set to be less than the maximum value as long as it sufficiently conceals the contents of the image data.

Figure 15:
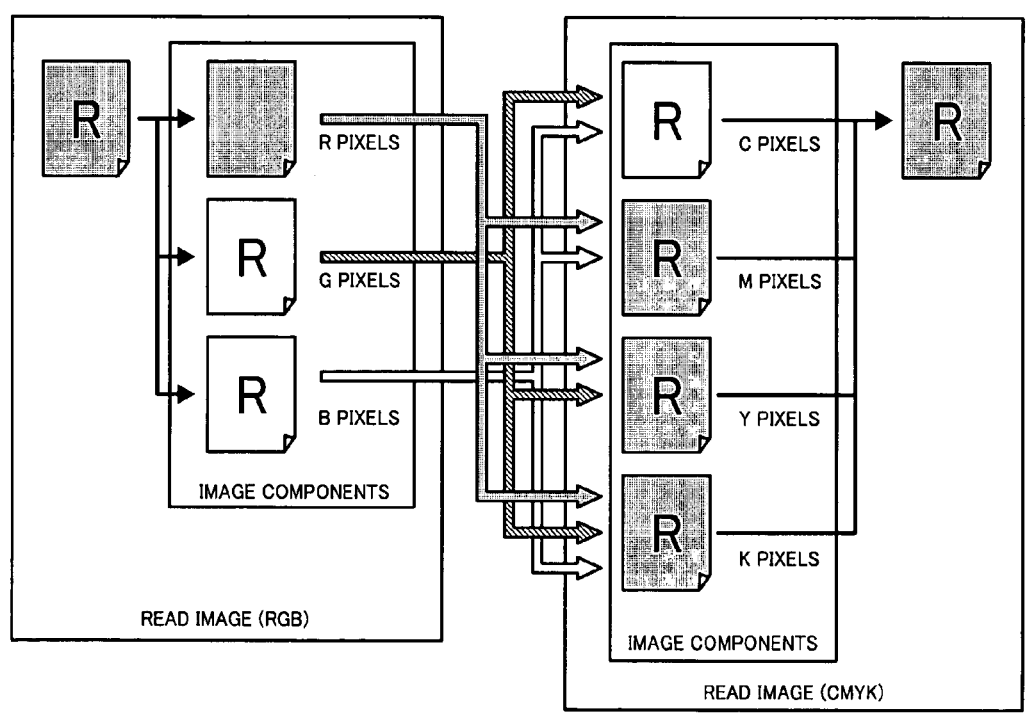
FIG. 15 is an illustration for explaining how the color components of RGB image data of an original document are reflected on the color components of CMYK image data when the original document is printed in a full-color mode while applying concealing processing to the R color component of the RGB Image data.
Figure 16:
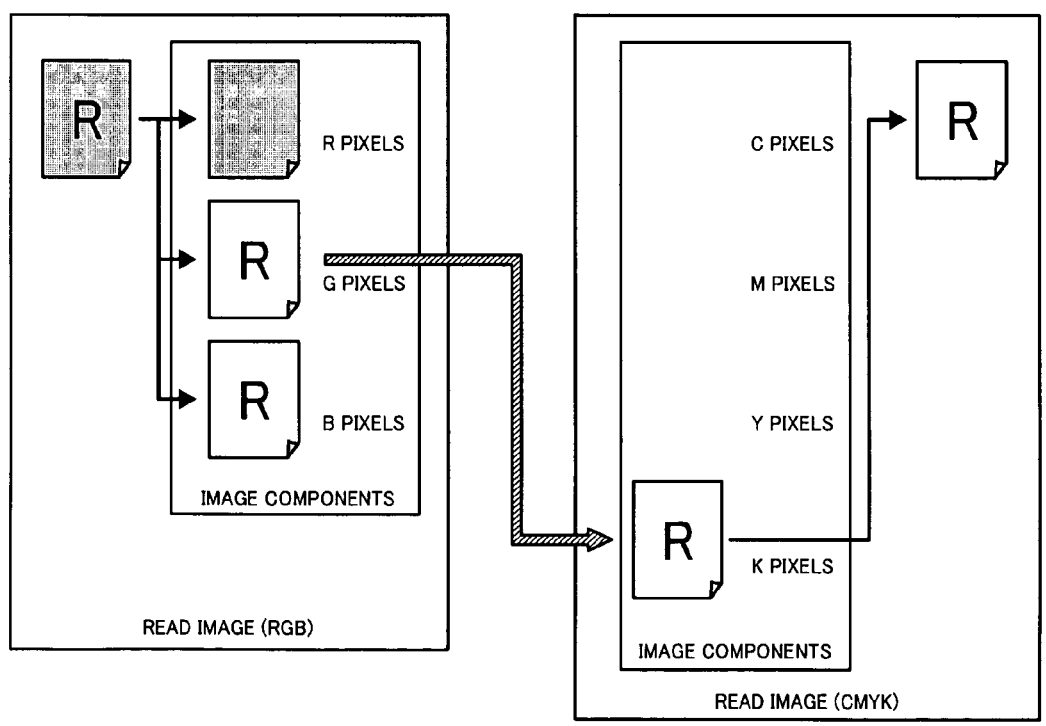
FIG. 16 is an illustration for explaining how the color components of RGB image data of an original document are reflected on the color component of monochrome image data when the original document is printed in a monochrome mode while applying concealing processing to the R color component of the RGB image data.

When concealing processing is applied to the R image data, the input image data, which is the RGB image data, and the output image data, which is the CMYK image data, may have the correspondence relationship as illustrated in FIG. 15 or 16. FIG. 15 illustrates an example case of converting the RGB image data to the CMYK image data while applying concealing processing to the R image data when the original document is printed in the full-color mode. FIG. 16 illustrates an example case of converting the G image data to the K image data while applying concealing processing to the R image data when the original document is printed in the monochrome mode. When printing the image data received through the facsimile apparatus as the monochrome image, as illustrated in FIG. 16, the G image data is converted to the K image data while applying concealing processing to the R image data as in case when the monochrome mode is selected. Further, when the facsimile image data is a monochrome image, the input image data only has the black/white components. The operation of converting the color space is performed by the color adjustment 27.

In the full-color mode, the color adjustment 27 converts the RGB image data, which is the secondary processed RGB image data having the solid image data generated from the R image data, to the CMYK image data. The R color component is reflected onto the color components of magenta, yellow, and black of the CMYK image data. The G color component is reflected onto the color components of cyan, magenta, and black of the CMYK image data. The B color component is reflected onto the color components of cyan, magenta, and black of the CMYK image data. Since any color component of the RGB image data will be reflected onto the black color component, the image data of any color, such as the R image data, G image data, and B image data, may be applied with the concealing processing to generate the solid image.

Figure 17:
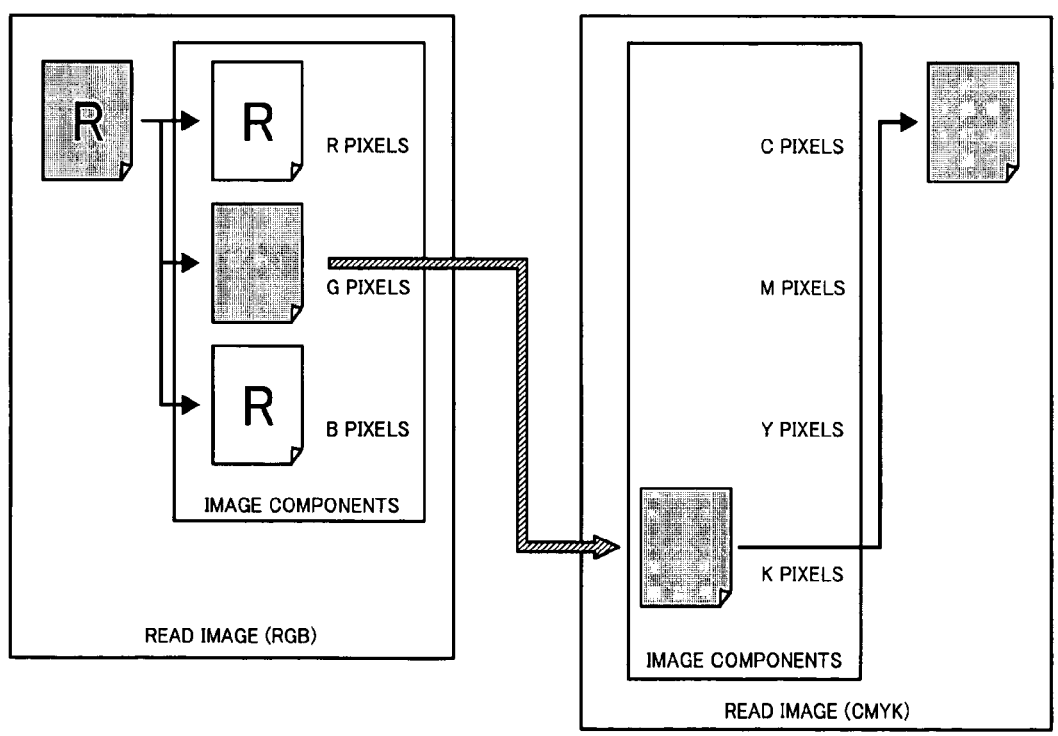
FIG. 17 is an illustration for explaining how the color components of RGB image data of an original document are reflected on the color component of monochrome image data when the original document is printed in a monochrome mode while applying concealing processing to the G color component of the RGB image data.

In the monochrome mode or in the case of outputting the black/white facsimile image data, the color adjustment 27 converts the G image data of the secondary processed RGB image data to the K image data. Even when the R image data or the B image data is set to be processed with concealing processing, the monochrome image data or the black/white facsimile image data, which is the G image data or the K image data, is not output as the solid image. When the G image data is set to be applied with the concealing processing, as illustrated in FIG. 17, the G image data is applied with the concealing processing such that the resultant monochrome image data or the black/white facsimile image data is output as the solid image. Further, in this case, the color image data is output as the solid image.

In this example, as illustrated in FIG. 8 or FIG. 10, whether to prohibit or allow copying of the monochrome image may be selected by the user. When copying of the monochrome image is allowed, the image data to be processed is set to the R image data such that the color image data is output as the solid image. In such case, the monochrome image or the black/white facsimile image data is not output as the solid image. By applying concealing processing only to the R image data, or the R color component, of the RGB image data, the image data that is not painted is output in the case of outputting the image data in monochrome and the image data that is painted is output in the case of outputting the image data in color.

When copying of the monochrome image is prohibited, the image data to be processed is set to the G image data such that the color image data as well as the monochrome image data is output as the solid image. By applying concealing processing only to the G image data, or the G image component, of the RGB image data, the image data that is painted is output in both cases of outputting the image data in monochrome and in full color.

In this example, when copying of the monochrome image is allowed, the image data to be processed is set to the R image data. Alternatively, the image data to be processed may be set to the B image data, or to both of the R image data and the B image data.

For the illustrative purpose, operation of copying an original document by scanning an original document by the scanner 210 and printing the image data of the original document by the printer 100 is explained. Referring to FIG. 11, the route A1 and A2 illustrates the flow of the image data from when the original document is scanned into the image data to when the image data is output as a printed document. When the user sets the original document in the scanner 210 of the copier C1 and selects the copying function, the CPU 5 causes the scanner 210 to perform input processing and causes the printer 100 to perform output processing. The user may further set various settings regarding the color, scaling, stapling, etc., and instructs the copier C1 to perform copying. The CPU 5 preserves an image data file area to store the image data being read in the memory area MAR, and instructs the scanner 210 to start reading the original document. In the case of reading one side of the original document, as the scanner 210 reads one page of the original document, one image data file of one page, which is the RGB image data, is generated. The CPU 5 determines whether the specific information is detected in the RGB image data to generate a detection result. The image data files are sequentially stored, line by line, in the order being read.

When operation of reading the original document is started, the image data being read is stored in the main memory 7 as indicated by the route A1. The output image data processor 2*d* converts the primary processed RGB image data, which is processed by the input image data processor 2*a*, to the CMYK image data, which is to be used for printing as indicated by the route A2. When operation of reading the original document is completed, the image data is stored in the HDD 8 from the main memory 7. When the detection result indicates that the image data does not contain any specific information, the image data is stored as it is in the HDD 8 without being applied with concealing information, as indicated by A3 of FIG. 11. Any further processing or editing may be performed on the image data stored in the HDD 8.

Figure 12:
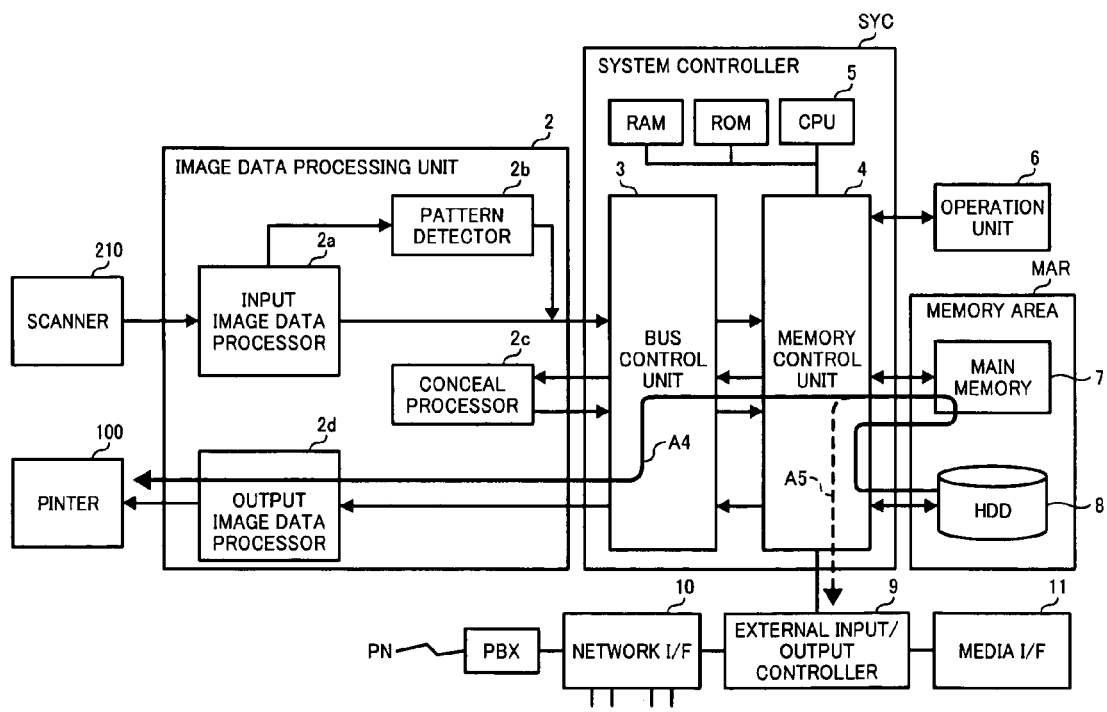
FIG. 12 is a schematic block diagram illustrating the flow of image data in the image processing system of FIG. 2 when the image data, which is not detected to include specific information, is printed after being read from a hard disk drive.

When repeatedly printing of the image data is needed, as illustrated in FIG. 12, the image data is read out from the HDD 8 onto the main memory 7, and deployed onto the main memory 7. The image data is then output to the output image data processor 2*b*. In the case of outputting the image data to the external apparatus, the image data is read out from the HDD 8 onto the main memory 7, and deployed onto the main memory 7. The image data is output to the external apparatus through the external input/output controller 9.

Figure 13:
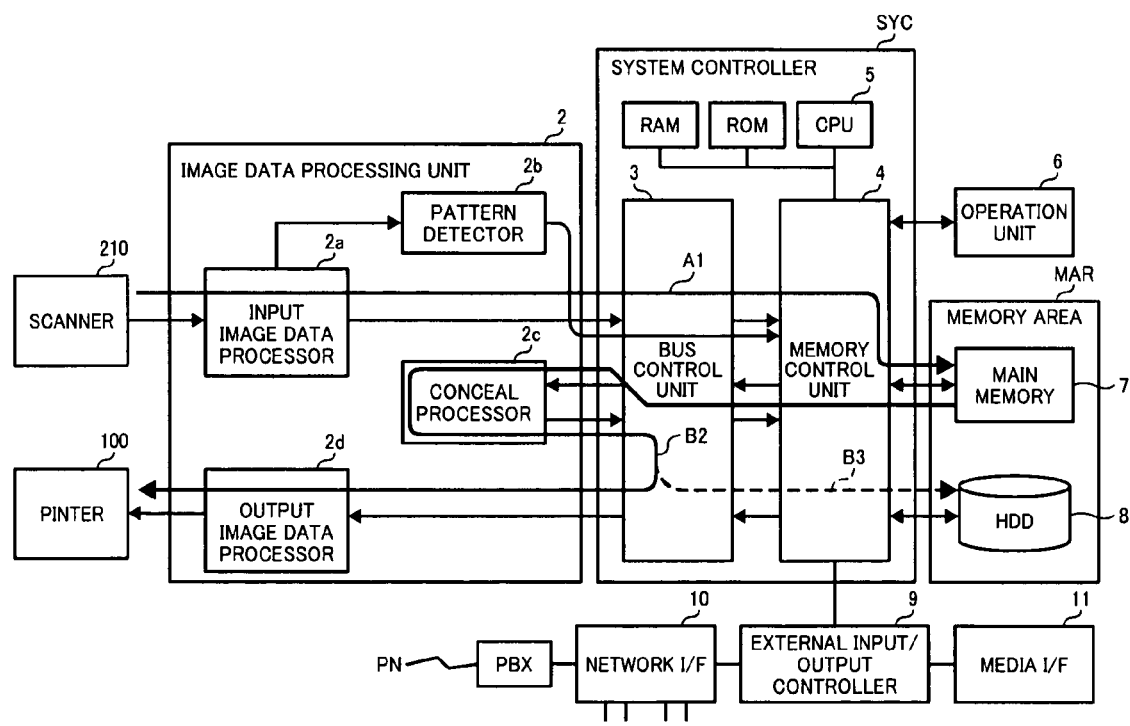
FIG. 13 is a schematic block diagram illustrating the flow of image data in the image processing system of FIG. 2 when the image data, which is detected to include specific information, is printed after being read by a scanner.
Figure 14:
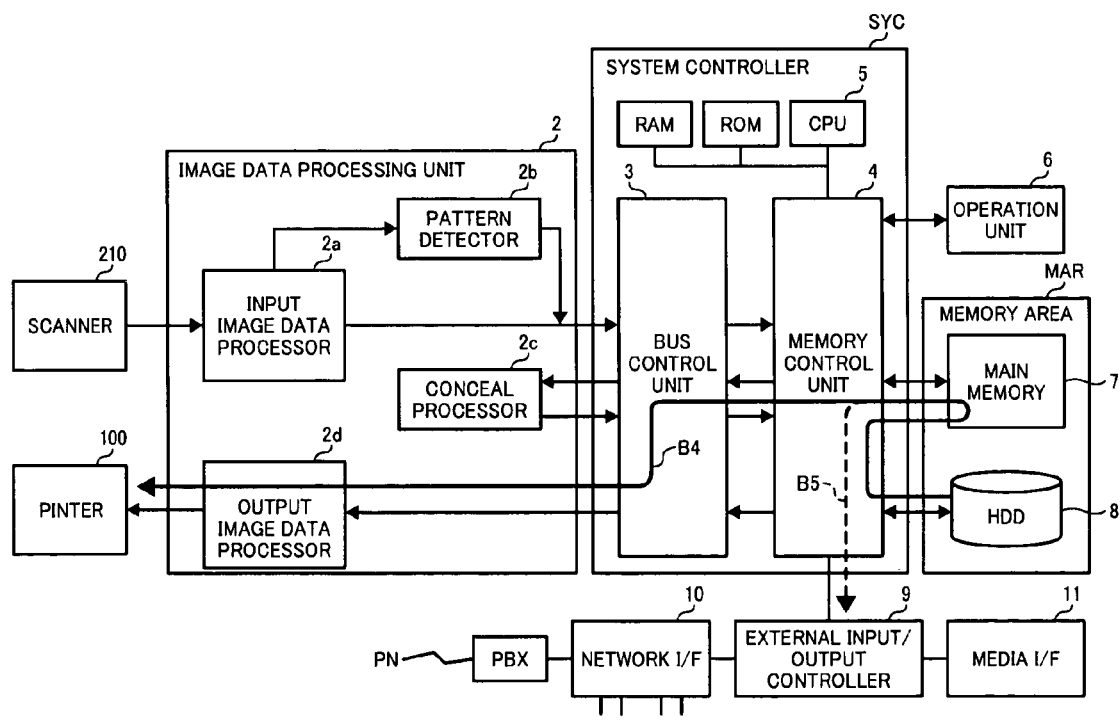
FIG. 14 is a schematic block diagram illustrating the flow of image data in the image processing system of FIG. 2 when the image data, which is detected to include specific information, is printed after being read from a hard disk drive.

When the detection result indicates that the image data contains the specific information, the image data flows as illustrated in FIG. 13. When operation of reading the original document is completed, the image data stored in the main memory 7 is output to the conceal processor 2*c* to be processed before being stored in the HDD 8 as indicated by the route B3 of FIG. 13. When repeatedly printing is needed, as illustrated in FIG. 14, the image data is read out from the HDD 8 onto the main memory 7, and deployed on the main memory 7. The image data is then output to the output image data processor 2*d*. When the image data is to be output to the external apparatus, the image data is read out from the HDD 8 onto the main memory 7, and deployed on the main memory 7. The image data is then output to the external apparatus through the external input/output controller 9.

When performing copying, in order to reduce the overall processing time that is required from scanning to printing, even when operation of reading the original document is not completed, printing may be sequentially performed on one line data as long as the one line data is read as illustrated in FIG. 11 or FIG. 13. In such case, when the detection result indicating that the image data contains the specific information is output, a portion of the image data may have been already gone through output processing. For this reason, the concealing processing is preformed concurrently with the operation of outputting the input image data as illustrated in FIG. 13. In this manner, even when the image data contains the specific information, printing of the image data may be prevented.

Further, in the case of repeatedly printing the same image data, when the image data contains the specific information, the image data to be read out from the HDD 8 and to be output to the output image data processor 2*d* should be applied with concealing processing. Accordingly, in this example, when the image data is read out from the main memory 7 onto the HDD 8, concealing processing is applied to the image data as indicated by the route B2 and B3 of FIG. 13. In the case of repeatedly printing the image data that is previously printed, the image data after being read out from the HDD 8 flows as indicated by B4 of FIG. 14, which is substantially similar to the case illustrated in FIG. 12. However, since the image data being stored in the HDD 8 has been applied with concealing processing, the image data is output as the solid image. Since the image data deployed onto the main memory 7 is repeatedly used for printing the same image which has been processed with concealing processing, the image data is output as the solid image while improving the processing speed.

When outputting the facsimile image data, which is the monochrome image data, the copier C1 may be set so as to perform operation of repeatedly printing the same image data differently as described above. For example, in the case of outputting the facsimile image data that is received from a facsimile apparatus, the user may cause the copier C1 to output the facsimile image data without applying concealing processing even when the facsimile image data contains the specific information. In such case, the user may set the option indicating copying of the monochrome image is allowed to be on through the setting screen SPP of FIG. 8. In this manner, outputting of the facsimile image data having the solid image may be prevented, thus saving the cost. Alternatively, in order to improve the security such as by protecting any image data that is detected to include the specific information, which can be easily output in various ways once it is stored in the HDD 8, the user may set the option indicating copying of the monochrome image is prohibited to be on through the setting screen SPP of FIG. 8.

Figure 18:
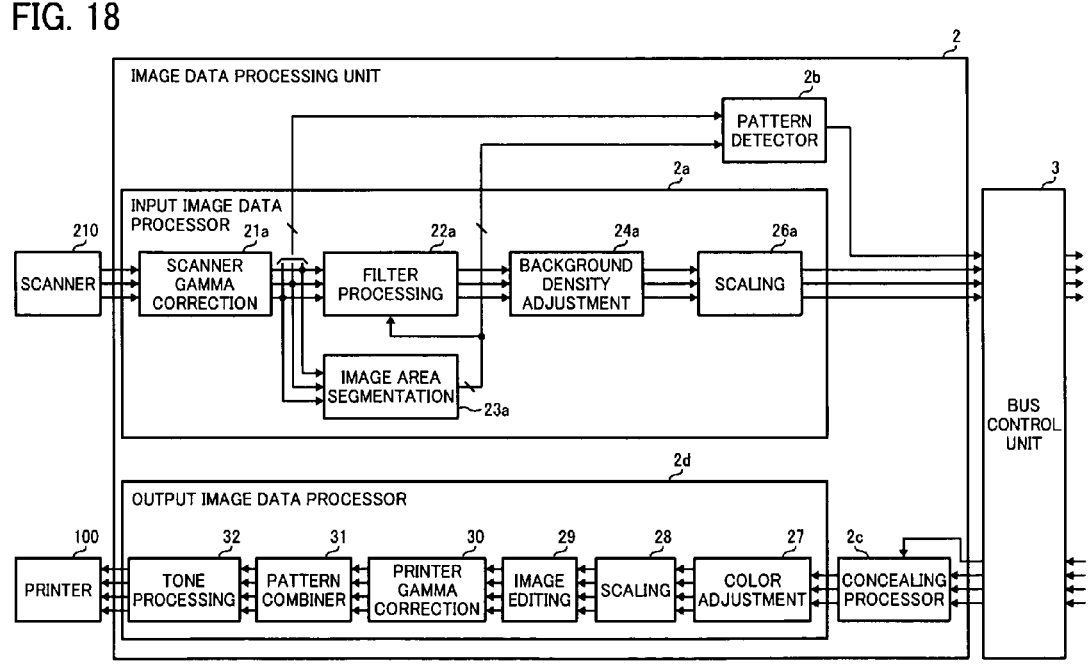
FIG. 18 is a schematic block diagram illustrating a functional structure of an image data processing unit of an image processing system of the image forming apparatus of FIG. 1, according to an example embodiment of the present invention.
Figure 19:
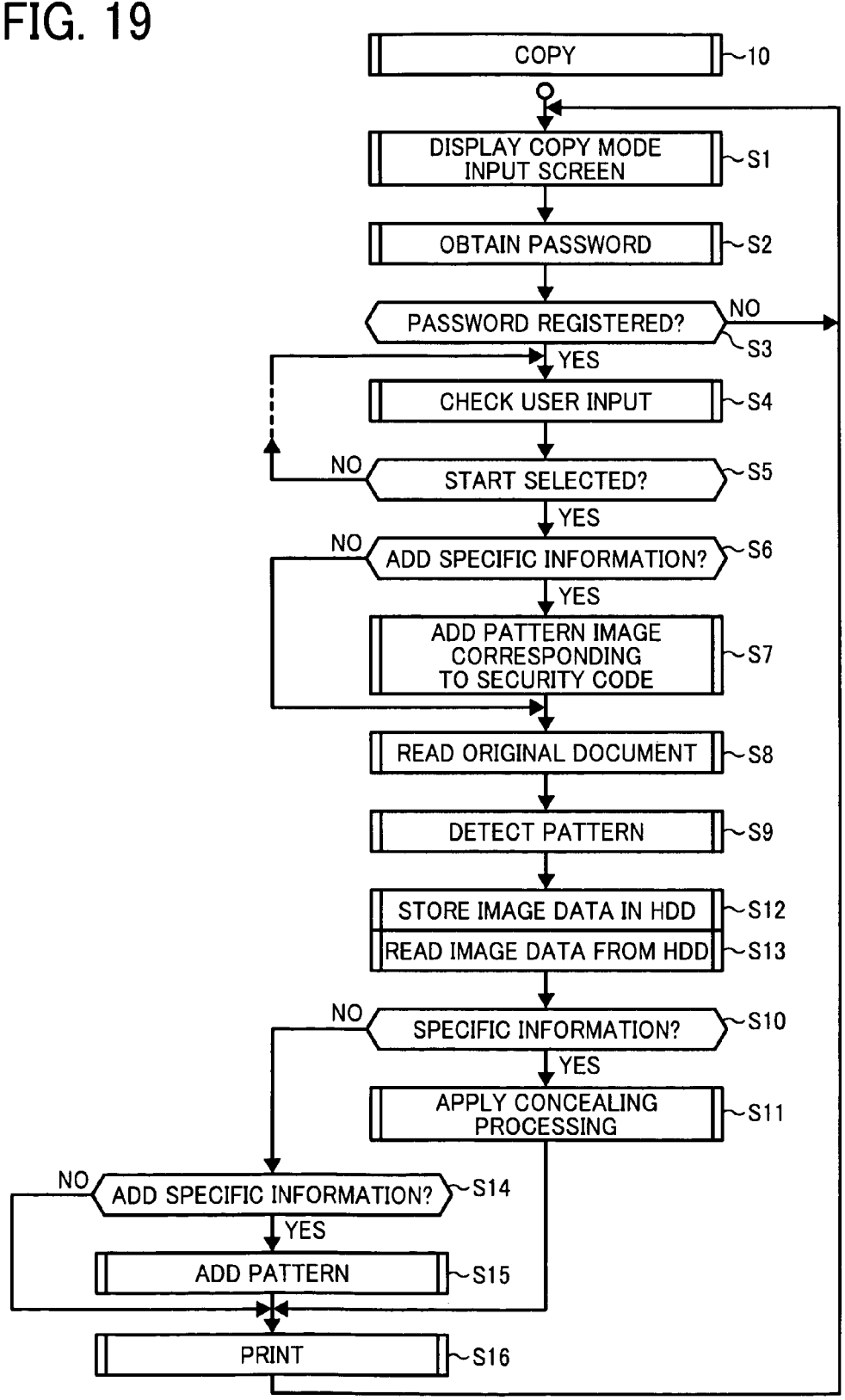
FIG. 19 is a flowchart illustrating operation of copying of FIG. 7, performed by the image forming apparatus of FIG. 1 provided with the image processing system having the functional structure of FIG. 18.

Referring now to FIG. 18, a functional structure of the image data processing unit 2 of the copier C1 is explained according to another example embodiment of the present invention. The image data processing unit 2 of FIG. 18 is substantially similar in function to the image data processing unit 2 of FIG. 4. The differences include the conceal processor 2c, which is arranged upstream the output image data processor 2d. FIG. 19 illustrates operation of copying, which may be performed at 10 of FIG. 7, is explained according to an example embodiment of the present invention. The operation of FIG. 19 is substantially similar to the operation of FIG. 9, except for the order of performing the steps of S10 and S11. More specifically, the operation of scanning the original document into the image data, writing the image data onto the main memory 7, and printing the first page of the original document may be performed in a substantially similar manner as described above referring to S8 to S10 of FIG. 9 and the route A1 and A2 of FIG. 11.

While operation of reading the original document is being performed, when the pattern detector 2b determines that the image data contains the specific information, the pattern detector 2b outputs the detection result indicating that the image data contains the specific information to the memory control unit 4. The memory control unit 4 stores, in its memory such as the register, the detection result indicating that the image data contains the specific information. The memory control unit 4 further sets the conceal processor 2c to apply concealing processing. As described above referring to S11 of FIG. 10, when the user instruction input through the operation unit 6 indicates that copying of the monochrome image is prohibited ("YES" at S21), the operation proceeds to S22 to set the concealing processor 2c to apply concealing processing to the G image data. When the user instruction input through the operation unit 6 indicates that copying of the monochrome image is allowed ("NO" at S21), the operation proceeds to S23 to set the concealing processor 2c to apply concealing processing to the R image data. As illustrated in FIG. 18, the conceal processor 2c converts the R image data or the G image data, which is set based on the user instruction, to the solid image. In the full-color mode, the color adjustment 27 converts the secondary RGB image data output by the concealing processor 2c to the YMCK image data. In the monochrome mode or in the case of outputting the black/white facsimile image data, the color adjustment 27 converts the G image data or the black/white facsimile image data to the K image data.

When operation of reading the original document is completed, or when the primary processed RGB image data is stored in the main memory 7, at S12, the CPU 5 causes the memory control unit 4 to compress the primary processed RGB image data and store the compressed image data in the HDD 8. When storing, information indicating whether the image data contains the specific information, i.e., the detection result of the pattern detector 2b, may be stored as property data of the image data.

Figure 20:
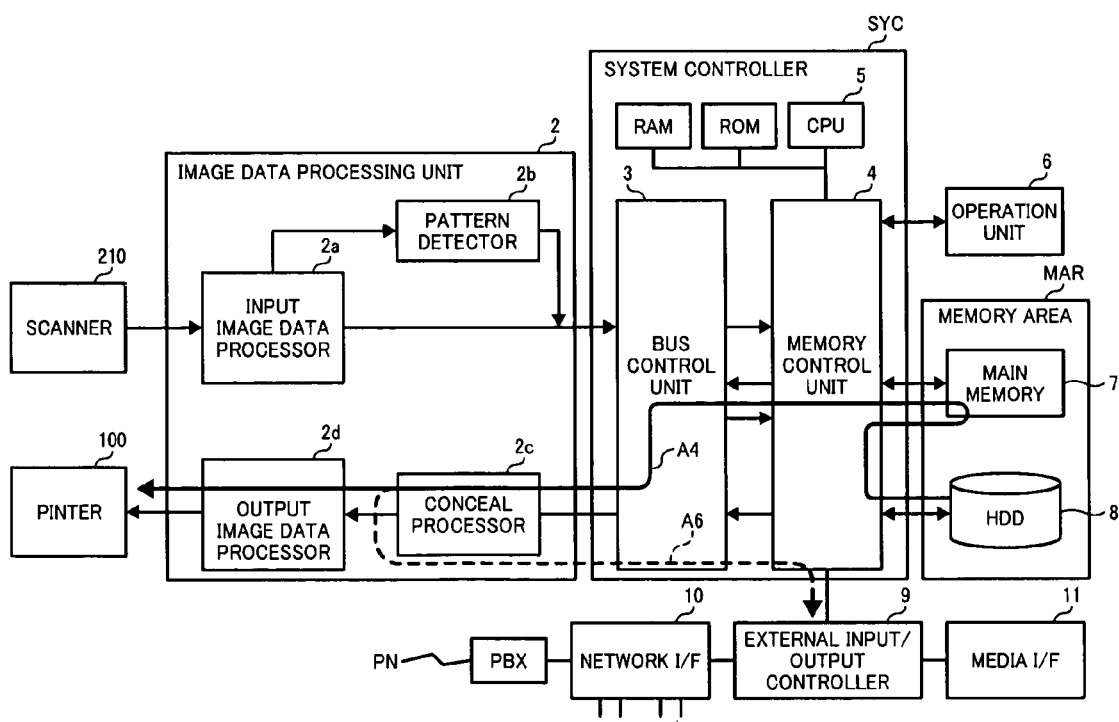
FIG. 20 is a schematic block diagram illustrating the flow of image data in the image processing system of FIG. 18, when the image data, which is detected to include specific information, is printed or transmitted to an external apparatus after being read from a hard disk drive.

In the example case of sequentially reading a plurality of pages of the original document, S8 to S12 is performed for each page of the original document. In the example case of repeatedly printing the original document such that more than one printing is performed on one page, the image data of the one page of the original document, which is read out from the HDD 8, is expanded and deployed on the main memory 7, and output to the output image data processor 2d, as indicated by the route A4 of FIG. 20. The memory control unit 4 may refer to the property data of the image data being stored in the HDD 8, which indicates the detection result indicating whether the image data contains the specific information. When the detection result indicates that the specific information is detected in the image data ("YES" at S10), the operation proceeds to S11. When the user instruction input through the operation unit 6 indicates copying of the monochrome image is prohibited, the conceal processor 2c is set to apply concealing processing to the G image data. When the user instruction input through the operation unit 6 indicates copying of the monochrome image is allowed, the conceal processor 2c is set to apply concealing processing to the R image data. The image data obtained from the HDD 8 and output through the main memory 7 is the primary processed RGB image data which is not applied with concealing processing. Before the image data is output to the output image data processor 2d, the conceal processor 2c of FIG. 18 may convert the primary processed RGB image data to the secondary processed RGB image data by applying concealing processing to the G image data or R image data of the image data.

In either one of the case in which the image data of the original document is printed for the first time and the case in which the image data of the original document is printed repeatedly, when the addition of the specific information is instructed ("YES" at S14), at S15, the pattern combiner 31 of the output image data processor 2d (FIG. 18) detects a character area and non-character area of the image data, adds the pattern image data to a background section of the image data that is determined to be the area other than the character and non-character areas, and combines the image data with the background section.

In the example case of transmitting the image data stored in the HDD 8 to the external apparatus, the memory control unit 4 may refer to the property data of the image data to be transmitted that indicates whether the image data contains the specific information. When the detection result indicates that the image data contains the specific information ("YES" at S10), the memory control unit 4 may further refer to information indicating whether copying of the monochrome image is prohibited or allowed. At S11, when copying of the monochrome image is prohibited, the conceal processor 2c is set to apply concealing processing to the G image data. When copying of the monochrome image is allowed, the conceal processor 2c is set to apply concealing processing to the R image data. After the image data read out from the HDD 8 through the main memory 7 is processed by the conceal processor 2c through the bus control unit 3, the processed image data is transmitted through the external input/output controller 9 as indicated by the route A6 of FIG. 20. When the detection result indicates that the image data does not contain the specific information ("NO" at S10), the image data read out from the HDD 8 through the main memory 7 is transmitted to the external apparatus through the external input/output controller 9.

Figure 21:
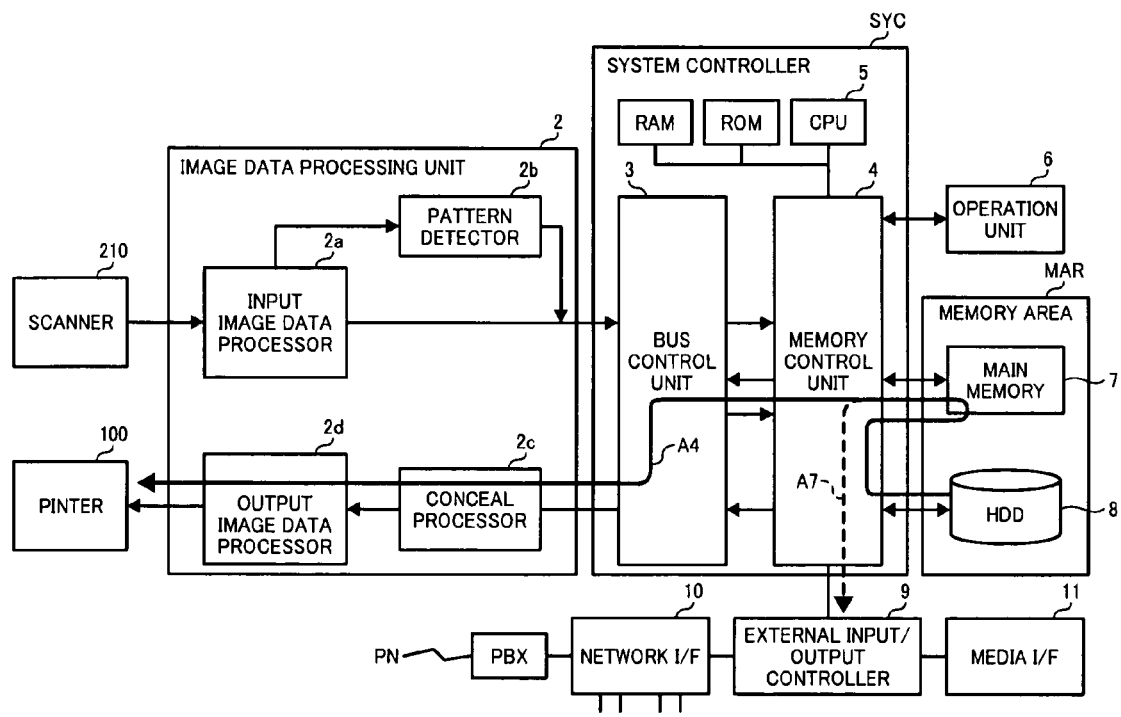
FIG. 21 is a schematic block diagram illustrating the flow of image data in the image processing system of FIG. 18, when the image data, which is detected to include specific information, is printed or transmitted to an external apparatus after being read from a hard disk drive.

Alternatively, the copier C1 may be set so as to apply concealing processing to the image data when the image data is printed or copied by the copier C1 but not to apply concealing processing to the image data when the image data is transmitted to the external apparatus together with information regarding the detection result indicating that the image data contains the specific information as indicated by the route A7 of FIG. 21. Further, when transmitting the image data to the external apparatus, the copier C1 may switch between the operation of transmitting the image data after applying the concealing processing to the image data as indicated by the route A6 of FIG. 20, and the operation of transmitting the image data without applying the concealing processing to the image data as indicated by the route A7 of FIG. 21, based on property information of the external apparatus to which the image data is sent. The property information of the external apparatus may be information indicating the type of the external apparatus such as the type of an image processing unit incorporated in the external apparatus.

In the above-described example, the image data is obtained from an original document by the scanner 210. Alternatively, the image data may be obtained by an image data generating device such as a photographing device capable of capturing the image data or any other device storing the image data.

As described above, when the original document is in color, the RGB image data of the original document is converted to the CMYK image data to be output as a printed document. In the full-color mode, the R image data is reflected on the M, Y, and K image data of the CMYK image data, and the B image data is reflected on the C, M, and K image data of the CMYK image data. In the case of printing the image data in the monochrome mode or in the case of outputting the black/white facsimile image data, the G image data of the RGB image data is converted to the K image data, while the R and B image data of the RGB image data is not converted.

When the R or B image data of the RGB Image data is pained with the solid image, the resultant CMYK image data becomes the solid image. In the case of printing the image data in the monochrome mode or in the case of outputting the black/white facsimile image data, since the G image data of the RGB Image data is converted to the K image data, the resultant K image data is not the solid image even when the R or B image data is painted.

When the G image data of the RGB image data is painted with the solid image, since the G image data of the RGB image data is reflected on the C, M, and K image data of the CMYK image data in the full-color mode, the resultant CMYK image data becomes the solid image. In the case of printing the image data in the monochrome mode or in the case of outputting the black/white facsimile image data, since the G image data of the RGB image data is reflected on the K image data, the resultant K image data becomes the solid image.

When outputting of the monochrome image of the original document is allowed even when the original document is detected to include the specific information, the R or B image data is set to be applied with concealing processing. In such case, the color image data of the original document is output as the solid image, while the monochrome image data of the original document is not output as the solid image. When outputting of the monochrome image or the color image of the original document is prohibited when the original document is detected to include the specific information, the G image data is set to be applied with concealing processing. In such case, the color image data and the monochrome image data of the original document are both output as the solid image.

Further, as described above, the facsimile image data that is received through an external facsimile apparatus is generated as the monochrome image data for many cases. Further, the facsimile image data is not likely to contain the specific information indicating that outputting of the facsimile image data is prohibited as the facsimile image data has been already transmitted through the network. Further, the facsimile image data may contain information that needs to be communicated to the user immediately. For this reason, the user of the copier C1 may select the option of allowing the printing of the monochrome image data. The copier C1 does not print the facsimile image data, which is the monochrome image data, as the solid image, while still printing the color image data as the solid image. For example, when the color of the pattern image to be added to the image data is set to be a specific color such as the R color by default, the image data having the specific information indicating that outputting of the image data is prohibited is most likely to be printed in color. In this manner, outputting of the image data having the specific information is sufficiently suppressed even when the option of allowing printing of the monochrome image is selected.

The present invention may reside in an image forming apparatus including: means for reading an original document to generate primary processed RGB image data; means for determining whether the primary processed RGB image data includes specific information indicating outputting of the primary processed RGB image data is prohibited; concealing processing applying means for converting the primary processed RGB image data to secondary processed RGB image data when the detection result indicates that the primary processed RGB image data includes the specific information, wherein when copying of a monochrome image is allowed, the concealing processing applying means converts R image data or G image data of the primary processed RGB image data to solid image data, and when copying of the monochrome image is prohibited, the concealing processing applying means converts G image data of the primary processed RGB image data to solid image data; color adjusting means for converting the secondary processed RGB image data to print image data, wherein when printing in a color mode, the color adjusting means converts the secondary processed RGB image data including the solid image data of the R image data or the G image data to CMYK image data, and when printing in a monochrome mode, the color adjusting means converts the solid image data of the G image data to K image data; and image forming means for forming an image of the print image data on a recording sheet.

With the above-described structure, when copying of the monochrome image is allowed, concealing processing is applied to the R image data and/or the B image data. When the image data is to be output in the color mode, the output image data is output as the solid image. When the image data is to be output in the monochrome mode, the output image data is not output as the solid image. When copying of the monochrome image is prohibited, concealing processing is applied to the G image data. When the image data is to be output in the color mode or monochrome mode, the image data is output as the solid image. In this manner, the user may select between the option in which the color image data is painted while the monochrome image data is not painted, and the option in which both of the color image data and the monochrome image data are painted.

The above-described image processing apparatus may further include: first storing means and second storing means for storing the image data; and controlling means. The primary processed RGB image data, which may be generated by the reading means from the original document, is stored in the first storing means. When reading of the original document is completed, the primary processed RGB image data is read out from the first storing means. When it is determined that the image data includes the specific information, the concealing processing applying means converts the primary processed RGB image data to the secondary processed RGB image data. When it is determined that the image data does not include the specific information, the concealing processing applying means does not convert the primary processed RGB image data. The image data read out from the first storing means is compressed and stored in the second storing means. The compressed image data read out from the second storing means is expanded and output to the color adjusting means. The above-described operation is controlled by the controlling means.

Since the image data stored in the second storing means is repeatedly used, output of the image data when the image data is detected to contain the specific information is sufficiently prevented even when performing operation of printing the image data more than one time.

In the above-described image forming apparatus, the controlling means causes the color adjustment means to convert the primary processed RGB image data generated by the means for reading from the original document to the print data to output the image forming means while being stored in the first storing means. When the means for determining determines that the image data includes the specific information while the original document is being read, the controlling means switches the image data to be output to the color adjustment means from the primary processed RGB image data to the secondary processed image data to which the concealing processing is applied by the concealing processing applying means.

Even when the image data is output as the image data is being read in order to improve the operability, the image data is output as the solid image when the image data is detected to include the specific information.

The above-described image processing apparatus may further include means for selecting whether copying of the monochrome image is prohibited or allowed according to a user input. With this structure, the user can select whether to apply concealing processing to the monochrome image data when the image data includes the specific information.

In the above-described image processing apparatus, when copying of the monochrome image is prohibited, the concealing processing applying means paints the G image data with the solid image. When copying of the monochrome image is allowed, the concealing processing applying means paints at least one of the R image data and the G image data of the RGB image data with the solid image.

The present invention may reside in a method of concealing information included in image data, including: determining whether primary processed RGB image data of an original document includes specific information indicating copying of the original document to generate a detection result; and converting the primary processed RGB image data to secondary processed RGB image data when the detection result indicates that the primary processed RGB image data includes the specific information. When copying of a monochrome image is allowed, R image data or B image data of the primary processed RGB image data is converted to solid image data. When the monochrome image is prohibited, G image data of the primary processed RGB image data is converted to solid image data. When printing in the color mode, the secondary processed RGB image data including the solid image data generated from the R image data or the B image data is converted to CMYK image data. When printing in the monochrome mode, the solid image data generated from the G image data is converted to K image data.

The present invention may reside in an image processing apparatus including: means for applying image processing to RGB image data of an original document to generate primary processed RGB image data including R image data, G image data, and B image data; means for determining whether the primary processed RGB image data includes specific information indicating outputting of the original document is prohibited to generate a detection result; and means for converting the primary processed RGB image data to secondary processed RGB image data when the detection result of means for determining indicates that the primary processed RGB image data includes the specific information. When outputting of the original document as a monochrome image is allowed even when the original document includes the specific information, the means for converting applies concealing processing to only at least one of the R image data and the B image data included in the primary processed RGB image data to make the at least one of the R image data and the B image data to be solid image data. When outputting of the original document as a monochrome image is prohibited when the original document includes the specific information, the means for converting applies concealing processing to only the G image data of the primary processed RGB image data to make the G image data to be solid image data.

The present invention may reside in an image processing system including: means for applying image processing to RGB image data of an original document to generate primary processed RGB image data including R image data, G image data, and B image data; means for determining whether the primary processed RGB image data includes specific information indicating outputting of the original document is prohibited to generate a detection result; and means for converting the primary processed RGB image data to secondary processed RGB image data when the detection result of means for determining indicates that the primary processed RGB image data includes the specific information. When outputting of the original document as a monochrome image is allowed even when the original document includes the specific information, the means for converting applies concealing processing to only at least one of the R image data and the B image data included in the primary processed RGB image data to make the at least one of the R image data and the B image data to be solid image data. When outputting of the original document as a monochrome image is prohibited when the original document includes the specific information, the means for converting applies concealing processing to only the G image data of the primary processed RGB image data to make the G image data to be solid image data.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc. Further, any portion of the computer program may be distributed through a network or downloaded from any storage device. For example, when downloaded onto a computer, the computer program may cause the computer to perform any one of the operations described above.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An image processing apparatus, comprising:
an input image data processing unit configured to apply image processing to RGB image data of an original document to generate primary processed RGB image data including R image data, G image data, and B image data;
a specific information detector configured to determine whether the primary processed RGB image data includes specific information indicating outputting of the original document is prohibited to generate a detection result; and
a conceal processor configured to convert the primary processed RGB image data to secondary processed RGB image data when the detection result of the specific information detector indicates that the primary processed RGB image data includes the specific information, wherein when outputting of the original document as a monochrome image is allowed even when the original document includes the specific information, the conceal processor applies concealing processing to only at least one of the R image data and the B image data included in the primary processed RGB image data to make the at least one of the R image data and the B image data to be solid image data, and when outputting of the original document as a monochrome image is prohibited when the original document includes the specific information, the conceal processor applies concealing processing to only the G image data of the primary processed RGB image data to make the G image data to be solid image data.

2. The image processing apparatus of claim 1, further comprising:
an original document reading unit configured to read the original document into the RGB image data and to send the RGB image data to the input image data processing unit;
a storage device configured to store the primary processed RGB image data output from the input image data processing unit in a compressed format or an uncompressed format; and
a controller configured to obtain the detection result of the specific information detector when the specific information detector generates the detection result,
wherein when the detection result of the specific information detector indicating that the primary processed RGB image data includes the specific information is obtained, the controller is configured to send the primary processed RGB image data read out from the storage device to the conceal processor to cause the conceal processor to convert the primary processed RGB image data to the secondary processed RGB image data, and to store compressed data of the secondary processed RGB image data in the storage device.

3. The image processing apparatus of claim 2, further comprising:
an output image data processor configured to convert the secondary processed RGB image data obtained from the storage device to print image data when the detection result of the specific information detector indicates that the primary processed RGB image data includes the specific information, wherein when the original document is to be printed as a color image, the output image data processor converts the secondary processed RGB image data including the solid image data generated from the at least one of the R image data and the B image data to CMYK image data such that information included in the original document is concealed when printed, and when the original document is to be printed as a monochrome image, the output image data processor is configured to:
convert the solid image data generated from the G image data of the secondary processed RGB image data to K image data when outputting of the original document as a monochrome image is prohibited such that the information included in the original document is concealed when printed, and
convert the G image data of the secondary processed RGB image data to K image data when outputting of the original document as a monochrome image is allowed such that the information contained in the original document is not concealed when printed; and
an image forming unit configured to form an image of the print image data on a recording sheet.

4. The image processing apparatus of claim 3, wherein when forming of the image of the print image data performed by the image forming unit is being processed concurrently with determining whether the primary processed RGB image data includes specific information performed by the specific information detector, the controller is configured to output the primary processed RGB image data to the output image data processor until when the detection result of the specific information detector is obtained, and to switch to output the secondary processed RGB image data generated by the conceal processor to the output image data processor when the detection result of the specific information detector indicating that the primary processed RGB image data includes the specific information is obtained.

5. The image processing apparatus of claim 4, further comprising:
a user interface configured to cause a display device to display a conceal processing setting screen, which requests a user to select whether the outputting of the original document as a monochrome image is allowed or prohibited when the original document includes the specific information and to receive a user instruction indicating whether the outputting of the original document as a monochrome image is allowed or prohibited,
wherein the controller is further configured to store information indicating whether the outputting of the original document as a monochrome image is allowed or prohibited in a storage device.

6. The image processing apparatus of claim 1, wherein when the input image data processing unit receives monochrome facsimile image data obtained through a facsimile apparatus, the monochrome facsimile image data is processed respectively by the input image data processing unit, the specific information, and the conceal processor, in replace of the primary processed RGB image data.

7. An image processing method, comprising:
applying image processing to RGB image data of an original document to generate primary processed RGB image data including R image data, G image data, and B image data;
determining whether the primary processed RGB image data includes specific information indicating outputting of the original document is prohibited to generate a detection result; and converting the primary processed RGB image data to secondary processed RGB image data when the detection result of a specific information detector indicates that the primary processed RGB image data includes the specific information, wherein when outputting of the original document as a monochrome image is allowed even when the original document includes the specific information, concealing processing is applied to only at least one of the R image data and the B image data included in the primary processed RGB image data to make the at least one of the R image data and the B image data to be solid image data, and when outputting of the original document as a monochrome image is prohibited when the original document includes the specific information, concealing processing is applied to only the G image data of the primary processed RGB image data to make the G image data to be solid image data.

8. The image processing method of claim 7, further comprising:

reading the original document into the RGB image data to which the image processing is applied;

storing in a storage device the primary processed RGB image data in a compressed format or an uncompressed format; and obtaining the detection result indicating whether the primary processed RGB image data includes specific information when the detection result is generated by the specific information detector, wherein when the detection result indicating that the primary processed RGB image data includes the specific information is obtained, the controller is configured to cause the primary processed RGB image data read out from the storage device to be converted to the secondary processed RGB image data, and to store compressed data of the secondary processed RGB image data in the storage device.

9. The image processing method of claim 8, further comprising:

converting the secondary processed RGB image data obtained from the storage device to print image data when the detection result indicates that the primary processed RGB image data includes the specific information, wherein when the original document is to be printed as a color image, the print image data is obtained by converting the secondary processed RGB image data including the solid image data generated from the at least one of the R image data and the B image data to CMYK image data such that information included in the original document is concealed when printed, and when the original document is to be printed as a monochrome image, the print image data is generated either by:

converting the solid image data generated from the G image data of the secondary processed RGB image data to K image data when outputting of the original document as a monochrome image is prohibited such that the information included in the original document is concealed when printed, and converting the G image data of the secondary processed RGB image data to K image data when outputting of the original document as a monochrome image is allowed such that the information contained in the original document is not concealed when printed; and forming an image of the print image data on a recording sheet.

10. The image processing method of claim 9, wherein when forming of the image of the print image data is being processed concurrently with determining whether the primary processed RGB image data includes specific information, the controller is configured to cause the primary processed RGB image data to be output until when the detection result is obtained, and to switch to output the secondary processed RGB image data to which the concealing processing is applied when the detection result indicating that the primary processed RGB image data includes the specific information is obtained.

11. The image processing method of claim 10, further comprising:

displaying a conceal processing setting screen, which requests a user to select whether the outputting of the original document as a monochrome image is allowed or prohibited when the original document includes the specific information;

receiving a user instruction indicating whether the outputting of the original document as a monochrome image is allowed or prohibited; and storing information indicating whether the outputting of the original document as a monochrome image is allowed or prohibited in a storage device.

12. A non-transitory computer readable recording medium including computer program instructions which cause a computer to execute an image processing method comprising:

applying image processing to RGB image data of an original document to generate primary processed RGB image data including R image data, G image data, and B image data;

determining whether the primary processed RGB image data includes specific information indicating outputting of the original document is prohibited to generate a detection result; and converting the primary processed RGB image data to secondary processed RGB image data when the detection result of a specific information detector indicates that the primary processed RGB image data includes the specific information, wherein when outputting of the original document as a monochrome image is allowed even when the original document includes the specific information, concealing processing is applied to only at least one of the R image data and the B image data included in the primary processed RGB image data to make the at least one of the R image data and the B image data to be solid image data, and when outputting of the original document as a monochrome image is prohibited when the original document includes the specific information, concealing processing is applied to only the G image data of the primary processed RGB image data to make the G image data to be solid image data.

13. The medium of claim 12, wherein the image processing method further comprises:

reading the original document into the RGB image data to which the image processing is applied;

storing in a storage device the primary processed RGB image data in a compressed format or an uncompressed format; and obtaining the detection result indicating whether the primary processed RGB image data includes specific information when the detection result is generated by the specific information detector, wherein when the detection result indicating that the primary processed RGB image data includes the specific information is obtained, the computer is configured to cause the primary processed RGB image data read out from the storage device to be converted to the secondary processed RGB image data, and to store compressed data of the secondary processed RGB image data in the storage device.

14. The medium of claim 13, wherein the image processing method further comprises:

converting the secondary processed RGB image data obtained from the storage device to print image data when the detection result indicates that the primary processed RGB image data includes the specific information, wherein when the original document is to be printed as a color image, the print image data is obtained by converting the secondary processed RGB image data including the solid image data generated from the at least one of the R image data and the B image data to CMYK image data such that information included in the original document is concealed when printed, and when the original document is to be printed as a monochrome image, the print image data is generated either by:

converting the solid image data generated from the G image data of the secondary processed RGB image data to K image data when outputting of the original document as a monochrome image is prohibited such that the information included in the original document is concealed when printed, and converting the G image data of the secondary processed RGB image data to K image data when outputting of the original document as a monochrome image is allowed such that the information contained in the original document is not concealed when printed; and forming an image of the print image data on a recording sheet.

15. The medium of claim 14, wherein when forming of the image of the print image data is being processed concurrently with determining whether the primary processed RGB image data includes specific information, the computer is configured to cause the primary processed RGB image data to be output until when the detection result is obtained, and to switch to output the secondary processed RGB image data to which the concealing processing is applied when the detection result indicating that the primary processed RGB image data includes the specific information is obtained.

16. The medium of claim 15, wherein the image processing method further comprises:

displaying a conceal processing setting screen, which requests a user to select whether the outputting of the original document as a monochrome image is allowed or prohibited when the original document includes the specific information;

receiving a user instruction indicating whether the outputting of the original document as a monochrome image is allowed or prohibited; and storing information indicating whether the outputting of the original document as a monochrome image is allowed or prohibited in a storage device.

* * * * *